Feb. 27, 1951 E. H. LAND 2,543,181
PHOTOGRAPHIC PRODUCT COMPRISING A RUPTURABLE CONTAINER
CARRYING A PHOTOGRAPHIC PROCESSING LIQUID
Filed Dec. 11, 1948 8 Sheets-Sheet 5

INVENTOR
Edwin H. Land
BY
Donald L. Brown
Attorney

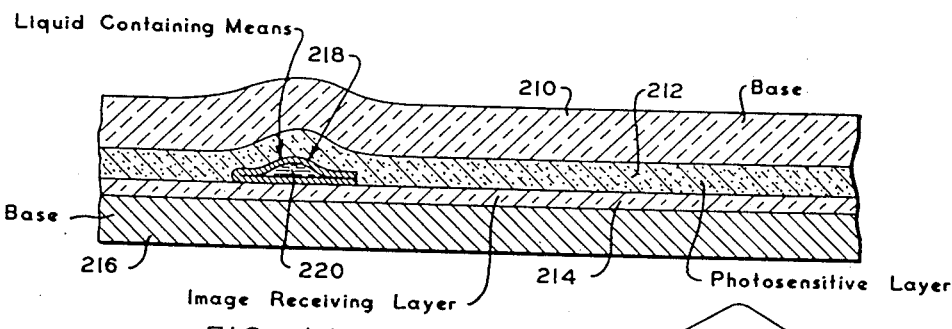
FIG. 14
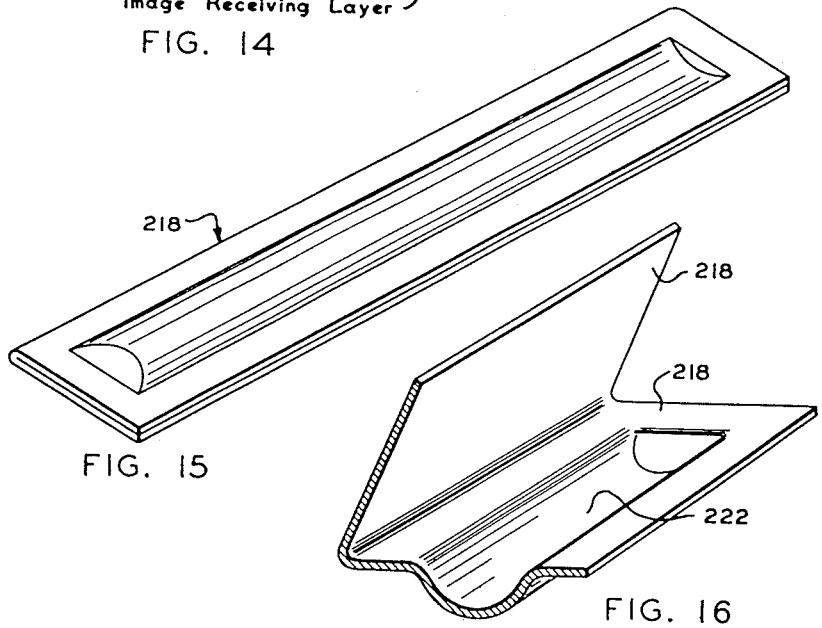
FIG. 15
FIG. 16
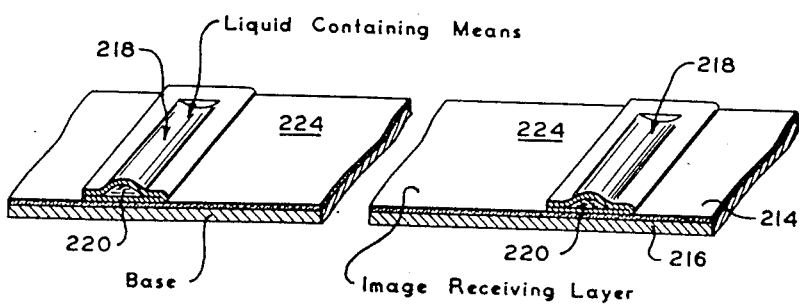
FIG. 17

Feb. 27, 1951    E. H. LAND    2,543,181
PHOTOGRAPHIC PRODUCT COMPRISING A RUPTURABLE CONTAINER
CARRYING A PHOTOGRAPHIC PROCESSING LIQUID
Filed Dec. 11, 1948      8 Sheets-Sheet 7

INVENTOR
Edwin H. Land
BY
Donald L. Brown
Attorney

Patented Feb. 27, 1951

2,543,181

UNITED STATES PATENT OFFICE 2,543,181

PHOTOGRAPHIC PRODUCT COMPRISING A RUPTURABLE CONTAINER CARRYING A PHOTOGRAPHIC PROCESSING LIQUID

Edwin H. Land, Cambridge, Mass., assignor to Polaroid Corporation, Cambridge, Mass., a corporation of Delaware Application December 11, 1948, Serial No. 64,870
In Canada January 15, 1947

116 Claims. (Cl. 95—8)

This invention relates to photography and more particularly to photographic products wherein a liquid is contained for processing a photographic, photosensitive material.

One object of the present invention is to provide a novel photographic product which comprises a rupturable, disposable container releasably carrying a photographic processing liquid or solvent and so constructed as to be able, upon application of a suitable stress thereto, to release its liquid content for substantially uniform distribution over a predetermined area of a photosensitive material to process the same, the photosensitive material being attached to and forming a part of said product or being first associated with said product during the processing thereof.

Another object of the present invention is to provide a composite photographic product of the foregoing type which includes a photosensitive layer and such materials as are required for so processing the photosensitive layer as to provide said product with a positive print of the subject matter to which said photosensitive layer is exposed.

Still another object of the present invention is to provide a novel sheetlike product whose external surfaces are normally dry and which includes a photosensitive layer, a container carrying a liquid, and such other materials as are required for subjecting the photosensitive layer to a predetermined chemical treatment, the liquid being releasable from the container between the outer surfaces of the product and upon release effecting the desired processing.

Still further objects are the provision of novel film means wherein a permeable layer is associated with means carrying a liquid material in such a way that the liquid is normally out of contact with said layer and capable, upon release, of permeating a predetermined portion of the said layer; wherein the permeable layer is an emulsion of photosensitive material of the type in which a developable image is formed by photoexposure and wherein the liquid material when it permeates said layer comprises a developer for said photosensitive material; wherein the film contains elements sufficiently impervious to the vapor of said liquid material and so located relative thereto as to prevent loss of the liquid by evaporation; wherein the means for containing the liquid material are constructed to permit ready release of the liquid when desired; and wherein means are provided for insuring substantially uniform distribution of the liquid material over the photosensitive area to be processed thereby.

Further objects are the provision of novel photographic materials in which a liquid reagent is releasable to permeate a silver halide photosensitive layer or the like having formed therein a latent image; in which the reagent develops the latent image and gives as a reaction product an image-forming component; in which the image-forming component is translated relative to the material of the developed latent image to form in another layer of material an image which is a positive of the subject matter to which the film was exposed in producing the latent image; in which the positive image-forming component is reacted in its relatively translated position to give a dye or pigment, e. g., silver, for forming the positive image; in which the transfer image is formed in positive print material separable from the photosensitive layer; and in which all of the materials involved in the formation of the latent image and the positive print thereof are included.

Still further objects are the provision of a novel composite product comprising a photosensitive layer and carrying a liquid wherein the liquid material is contained in sacs; wherein the liquid material is relatively viscous so that it may be uniformly spread over a predetermined area of the photosensitive material which it is to process; wherein the desired viscosity is imparted to the liquid material by a film-forming thickening agent; wherein the liquid material is capable of release for spreading between the photosensitive layer and a receiving layer for a transfer print; and wherein the liquid material upon release provides at least a portion of the stratum for receiving the material of the transfer print.

Still another object is to provide a novel sheet material comprising a container which releasably carries a liquid reagent, said container being so constructed and so mounted as to be able to release its liquid for spreading over a predetermined surface area of said material.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 14 is an exaggerated, diagrammatic, fragmentary, sectional view taken along the longitudinal axis of still another form of product comprehended by the present invention;

Fig. 15 is a perspective view of one form of sac or pod for containing the liquid reagent of the product of Fig. 14;

Fig. 16 is a fragmentary perspective view showing the sac of Fig. 15 just before the latter is filled with the liquid material;

Fig. 17 is a fragmentary, exaggerated, sectional view taken along the longitudinal axis of one form of novel sheet material comprehended by the invention;

Figure 1:
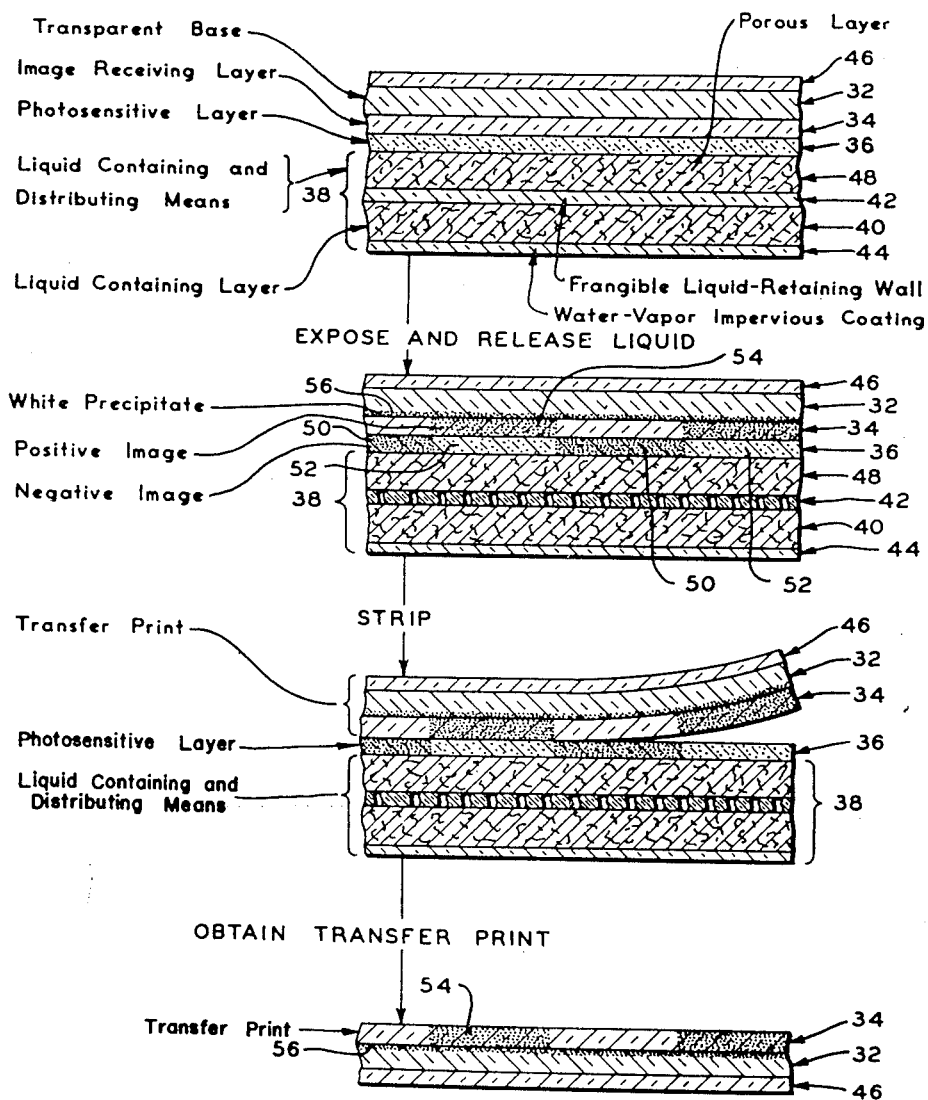
Figure 1 is four enlarged, diagrammatic, fragmentary, sectional views of four stages in the use of one form of photographic product comprehended by the present invention.

In a preferred form, the novel film of the present invention comprises a photosensitive layer, as for example, a silver halide-gelatin emulsion, means for developing a latent image formed in said photosensitive layer and means for forming a positive image in said film as a product of the development of said photosensitive layer, said positive image being formed either in the photosensitive layer or in another layer of the film. The material in which the positive image is formed may be so attached to the film as to be readily stripped therefrom after formation of the positive image.

A liquid is preferably carried by the film out of contact with the photosensitive layer and is adapted, when released from the containing means therefor, to permeate said photosensitive layer. The liquid may contain, in solution, the developer for the photosensitive material of the film, or it may comprise a solvent for the developer, the latter being contained as a solid in another layer of the film through which the liquid must travel in order to reach the photosensitive layer. The liquid material may also contain, or dissolve in its travel to the photosensitive layer, other compounds which are desired in the treatment of the photosensitive layer and in the production of a fixed positive image in accordance with the invention.

The liquid may be carried by the film in any one of several ways as, for example, by providing the film with a plurality of cell-like chambers for containing the liquid, or by forming on, or securing to, the film a plurality of sacs or containers of the liquid, or by providing the film with a layer of a microscopically porous material or a blotter-like material saturated with said liquid, or by providing a true emulsion of said liquid in one of the layers of the film.

The liquid material is released to permeate the photosensitive layers of the film in any of several ways, depending on the manner in which it is carried by the film. If, for example, the liquid is contained in chambers, or in a blotter-like material, a liquid-retaining wall or membrane is provided for said chambers or material separating the latter from the photosensitive layer and is formed, for example, of a relatively brittle plastic which, when subjected to stretching, is adapted to fracture, releasing the liquid. If the liquid is contained in an emulsion or in containers, the liquid may be released by compressing the film or, in the case of the containers, by piercing the latter.

In one form of the invention there is provided between the liquid-retaining means and the photosensitive material a layer of permeable and relatively deformable material such as a porous paper, for example, blotter paper. This layer preferably adjoins the liquid-retaining membrane and serves as a deformable backing against which the membrane can be fractured. It also acts to diffuse the liquid released from the liquid-retaining means and insures a uniform dispersion of the latter throughout the photosensitive layer. A porous, permeable layer of this character, located between the liquid-retaining means and the photosensitive layer, may also serve as the means for carrying in solid form one or more of the compounds used in the photographic processes of the invention, which compounds are to be dissolved by the liquid and transported thereby to the photosensitive layer in carrying out said processes.

To prevent loss of the liquid material by vaporization, the liquid-containing means is rendered vapor impervious, for example, by providing the film with a continuous coating, i. e., a casing, of a vapor-impervious material such as paraffin or polyethylene. It is to be understood that the coating material may be provided on the outer surfaces of the film or between predetermined layers thereof, provided that the casing or envelope of vapor-impervious material thus formed contains therewithin the liquid-containing means. If the means for containing the liquid comprises cells or chambers, vapor loss may also be prevented by lining the walls of said cells or chambers with the vapor-impervious material.

One method of forming a positive image, in accordance with the present invention, consists in exposing a layer of photosensitive material to form therein a latent image and then permeating said layer with a liquid reagent adapted to develop the latent image, and to give, in addition to the developed latent image, an image-forming component. The image-forming component and the developed silver halide are thereafter translated relative to one another, and in its relatively translated position the image-forming component acts to form a fixed image which is the positive of the subject matter of the latent image. This method may be carried out with the above-described film, the liquid-containing means providing the liquid reagent.

In one modification of the method, the relative translation of the image-forming component and the developed silver halide is obtained by movement of the image-forming component to a layer of positive print material adjacent the photosensitive layer.

One way of forming a positive image, in accordance with the modification of the process wherein the image-forming component is transported to an adjacent positive print or image-receiving layer, comprises the step of permeating the photosensitive layer, after the latter is exposed, with a liquid reagent comprising a developer for the exposed silver halide of said layer and a compound for forming soluble complex ions with the nonexposed silver halide. The liquid reagent acts to develop the exposed silver halide, and the nonexposed silver halide is dissolved in said reagent to provide the image-forming component. The latter migrates from the photosensitive layer to the adjacent positive print layer where it is developed and provides in silver a fixed positive of the latent image.

Another method of forming a fixed image in a positive print layer is to have the photosensitive layer of the film suitably treated as, for example, by solarization prior to its differential exposure to actinic light in a camera so that development, after exposure, takes place in those areas which are unexposed during said differential exposure. The liquid reagent for the photosensitive layer contains a developer which gives as its oxidation product a dye base adapted to migrate from said layer to the adjacent positive print layer. There is uniformly dispersed throughout the surface layer of the latter material a coupler which is adapted to react with said dye base, whereby the migration of said base is effective to differentially dye the positive print material and to form therein the desired positive image.

In another embodiment of this method of producing the fixed image, employing a solarized photosensitive layer, the coupler and the developer are contained in the liquid reagent and the dye, which is the product of the reaction of said coupler and the oxidized developer, is of a type adapted to migrate from the photosensitive layer to the positive print material.

Still another embodiment of the invention, wherein the photosensitive layer is solarized, is to have the coupler dispersed throughout the photosensitive layer and adapted to form with the oxidized developer a migratory dye, or to have the oxidized developer couple with itself to form the migratory dye. The dye is then transported to, and dyes, an adjacent positive print layer to give a fixed positive dye image.

Referring to Fig. 1 there is illustrated diagrammatically one embodiment of the novel photographic film of the invention which, as shown, comprises a suitable base 32 formed of a transparent material, preferably a plastic, such as a cellulosic ester, or a synthetic superpolymer of the nylon type, a layer 34 of clear gelatin, polyvinyl alcohol or other transparent material wherein a positive image may be formed and a layer 36 of photosensitive material such as a silver halide gelatin emulsion, said layers being superimposed upon the base in the order named.

The film is provided with novel liquid-containing means 38 which, as illustrated, comprises a sheet 40 of porous material such as blotter paper, containing within its pores a predetermined quantity of at least the solvent, e. g., water, for the liquid reagent. To retain the liquid within said sheet a frangible liquid-retaining wall or membrane 42 formed, for example, of a relatively brittle plastic such as polystyrene, is laminated to one face of said sheet between the latter and layer 36, and a thin film 44 of water-vapor-impervious material, such as paraffin or polyethylene, is coated on the other side of said sheet. Film 44 forms a part of a casing which completely encloses sheet 40 and prevents loss by vaporization of the liquid content of said sheet. As shown, a layer of the vapor-impervious material forms an outer coating 46 for base 32, but it is equally possible to employ a vapor-impervious plastic, such as polyethylene, as the base 32 and to connect said base with layer 44 by an edge seal to provide the vapor-impervious casing.

To release the liquid from sheet 40, membrance 42 is fractured as by being stretched beyond its yield point. In order to provide a deformable base against which said membrance may be fractured, and to insure a uniform permeation of photosensitive layer 36 by the reagent when the latter is released, a porous layer 48, for example, of the same material as sheet 40, is located between membrane 42 and said photosensitive layer. It is to be understood that layer 48 may contain in solid form one or more of the compounds for the liquid reagent, which compounds are dissolved in the liquid as it passes through said layer.

All of the above-described layers are laminated together in any suitable manner to form the film and layer 36 is secured to layer 34 so that separation of the two film portions on opposite sides of the interface of said layers may be readily effected. It is to be expressly understood that the drawings are diagrammatic and that the layer thicknesses are not drawn to scale. The overall thickness of the film may vary from a thickness somewhat greater than, to a thickness several times that of, ordinary photographic film.

One method of forming a fixed image in accordance with the present invention is to provide within means 38 a liquid reagent and to provide in said reagent a developer, e. g., hydroquinone, and a compound, e. g., sodium thiosulfate, which forms soluble complex ions with silver halide at a less rapid rate than the developer will develop exposed silver halide. To carry out the method, a frame of the film is differentially exposed to actinic light, as for example in a camera, so that a latent image is formed in layer 36. After exposure, membrane 42 is fractured to cause the liquid reagent to permeate layer 36. At exposed areas 50 of said layer, development takes place and the silver halide is reduced to silver, remaining in layer 36, whereas at unexposed areas 52 the silver halide forms a soluble complex and is transported at least in part by the reagent to adjacent positive print layer 34 where reduction of the complex silver ions in solution is effected by the developer to form areas 54 of silver, the latter areas corresponding to the unexposed areas 52 of layer 36. An image is thus produced which is the positive of the latent image formed in photosensitive layer 36, and in order to produce a white, opaque background for such image the surface layer of base 32 adjoining layer 34 has dispersed thereon or therein a colorless compound which reacts with a compound contained in the liquid reagent to form a layer 56 of white precipitate. It is to be understood that the colorless compound may also be contained in a suitable permeable, transparent layer, for example of gelatin, disposed between base 32 and layer 34.

If a positive transparency is desired instead of a print with an opaque backround, one or both of the above compounds for producing layer 56 may be eliminated from the film.

The positive print comprising a silver image on a white or transparent background, as desired, is obtained by stripping base 32 together with layer 34 from the remainder of the film, as shown in Fig. 1. It will be noted that the print thus obtained is corrected for geometric reversal.

In the above-described embodiment, the developer and the other reactive ingredients of the reagent may be contained either in layer 48 or in the liquid in layer 40. It is also possible to provide one or more of these materials in solid form in photosensitive layer 36, but this procedure is not preferred because it will tend to desensitize said layer.

An example of a liquid reagent suitable for permeating the photosensitive layer in order to carry out the above method is one consisting of:

| | | |
|---|---|---|
| Sodium sulfite (anhydrous) | grams | 9.0 |
| Hydroquinone | do | 4.5 |
| Sodium hydroxide | do | 3.75 |
| Potassium bromide | do | 3.00 |
| Sodium thiosulfate | do | 10.00 |
| Water to make | cubic centimeters | 170 |

In another method of forming a positive image, layer 36 is solarized approximately to, or just beyond, the reversal point so that when said layer is differentially exposed to actinic light, as in a camera, and then developed, the development occurs in the nonexposed areas. In this form of the invention, the reagent provided by containing means 38 contains a developer such as a p-phenylene-diamine which, when oxidized, will react with a coupler such as alpha-naphthol to form a relatively blue dye. To form the positive image, the coupler may be contained in the liquid reagent or it may be dispersed throughout layers 36 or 48 and the dye which is formed migrates to layer 34 to form the positive image. The coupler may also be dispersed throughout layer 34, in which event the oxidized developer migrates to the latter layer and the dye is formed there. It is to be understood that the developer may also be of the type which provides, as a reaction product of development, a compound which couples with itself to form a dye. Examples of developers of this type are pyrocatechin and p-phenylene-diamine.

Any of the other aforementioned methods of obtaining positive prints which involve the use of a suitable liquid reagent, in combination with a photosensitive layer and a positive print layer, may be carried out with the above-described film.

Figure 2:
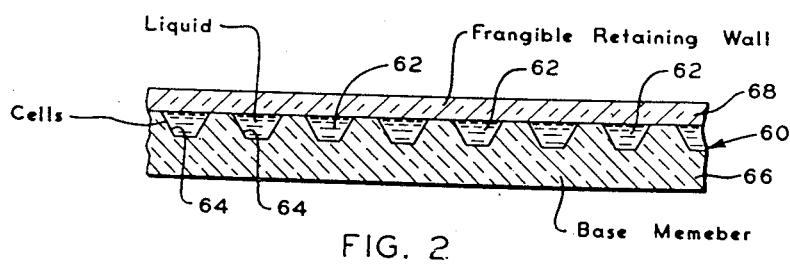
Fig. 2 is an enlarged, diagrammatic, fragmentary, sectional view of a modification of the liquid-containing means of the product shown in the first stage of Fig. 1.

A modification 60 of the liquid-containing means 38 of Fig. 1 is shown in Fig. 2 and comprises a plurality of cells or chambers 62 formed by a plurality of grooves 64 in a base member 66, such as a sheet of cellulose acetate or cellulose nitrate, said grooves being preferably filled with the liquid and sealed by a frangible membrane or wall 68 formed, for example, of polystyrene and corresponding in function and structure to membrane 42 of the film of Fig. 1. Liquid-containing means 60 may be substituted for means 38 and, if desired, a porous layer corresponding to layer 48 of the film of Fig. 1 may be provided between membrane 68 and layer 36 when means 60 is so substituted.

It is to be understood that cells 62 of developer-retaining means 60 may be of various shapes, as for example rectangular or substantially circular in cross-section. It is preferable too that grooves 64 do not extend continuously across the film, so that in each transverse row of said grooves there is provided a plurality of cells. Moreover, the cells of successive rows are staggered so that the film can be cut longitudinally into strips after the cells are filled, for example during the manufacture of the film, without appreciable loss of liquid, and without rendering the strips thus obtained inoperative.

Figure 3:
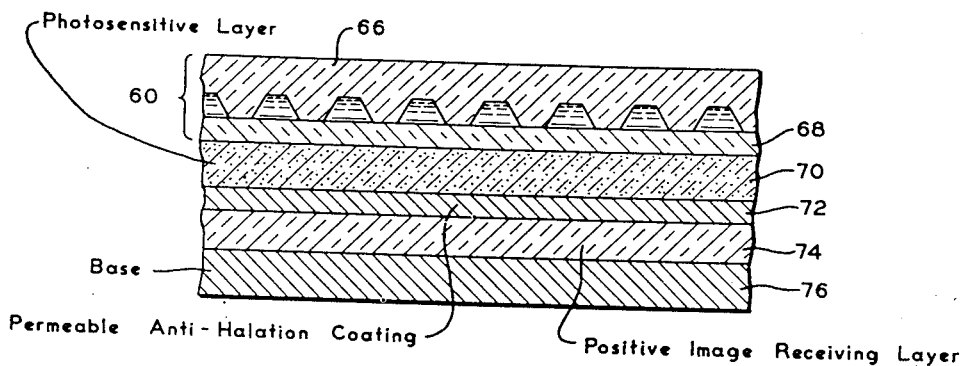
Fig. 3 is a view similar to Fig. 2 of another embodiment of a composite product of the present invention.

Referring to Fig. 3 there is illustrated another modification of the novel film means of the present invention which comprises, as the outer or base layer thereof, liquid-containing means 60, a photosensitive layer 70 being supported by membrane 68 of said liquid-containing means. Separated from layer 70, by a permeable antihalation coating 72, is a layer 74 of gelatin, polyvinyl alcohol, regenerated cellulose, hydroxyethyl cellulose, or other transparent, water-permeable material wherein the positive image is adapted to be formed. Coating 72 is desirable but not essential, and layer 74 may adjoin layer 70 to give satisfactory results. A backing or base 76, preferably of an opaque material such as paper, supports layer 74 and forms therewith the positive print material. The latter is secured to coating 72 so that it can be readily stripped therefrom when desired. To prevent gradual loss of developer by evaporation, the walls of cells 62 may be coated with water-vapor-impervious material such as polyethylene or paraffin, or the film may be encased in a coating of said material. It is to be understood that layer 74 need not be transparent, but may be formed of a relatively opaque material such as paper, in which event backing 76 may be dispensed with. It is also possible to form backing layer 76 of opal cellulose acetate and to provide layer 74 by regenerating the surface of the acetate sheet to cellulose.

It will now be apparent that any of the above-described methods of forming a positive image by causing an image-forming component to be translated to a positive print layer from a photosensitive layer, in accordance with the development of the latter, and specifically the methods described in connection with the film of Fig. 1, may also be employed with the film structure of Fig. 3. Layer 70 is exposed through liquid-retaining means 60, which is sufficiently homogeneous optically to be transparent, and after exposure the developing solution in cells 62 is released to saturate said layer by fracturing membrane 68. The development of layer 70 provides, in accordance with any of the hereinbefore described methods, a positive image in layer 74. Thereafter, layers 74 and 76 are stripped as a unit from the remainder of the film. The positive image which is thus formed in positive print material 74, 76 is not corrected for geometric reversal However, the camera wherein the film is exposed may be provided with a suitable optical system for effecting optically the correction for reversal.

Figure 4:
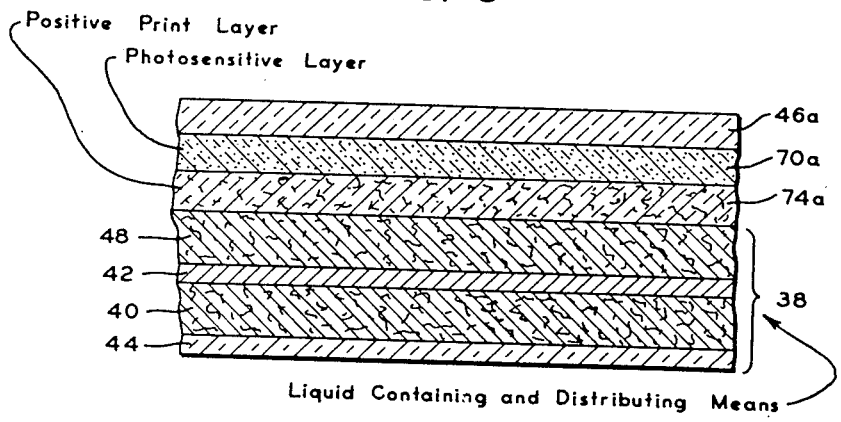
Fig. 4 is a view similar to Fig. 2 of still another embodiment of the product of the present invention.

Another modification of the film means of the invention is shown in Fig. 4 and comprises a photosensitive layer 70a, a positive print layer 74a, and liquid-containing means 38 mounted adjacent layer 74a, i. e., on the side of layer 74a remote from layer 70a. Although, as shown, layer 70a adjoins layer 74a, it is to be understood that an antihalation layer of permeable material may be provided therebetween. A film base 46a may be provided for photosensitive layer 70a and in a preferred form of this embodiment, said base is formed of a transparent, water-vapor-impervious plastic, such as polyethylene, which is connected to vapor-impervious layer 44 of liquid-containing means 38 by suitable edge seals to provide a vapor-impervious envelope for the film. A novel method of forming a positive image in layer 74a comprises providing a developer, and a compound for forming a soluble complex with silver halide in any one of layers 48, 74a, and 70a, or in solution in the liquid-containing layer 40, the latter carrying a solvent, such as water, for said materials. An alkali, such as sodium hydroxide or trisodium phosphate, may also be included in one of said layers or in the solution. It is to be understood that one or more of these materials may be contained in one or more of layers 48, 74a of 70a, and the rest of said materials may be contained in solution in the liquid in layer 40.

A suitable developer for this prupose is hydroquinone, and a suitable compound for forming the soluble complex ions with the silver halide is sodium thiosulphate.

To carry out the method of the invention, layer 70a is exposed through layer 46a and has formed therein a latent image. Membrane 42 is then fractured and the liquid contained in layer 40 permeates through layers 48 and 74a and provides a liquid reagent for layer 70a which contains the developer and the compound for reacting with silver halide to form a soluble complex. Wherever layer 70a has been exposed, the developer acts to reduce the silver halide to silver, but where no development occurs, soluble ions are formed which are at least in part translated to positive print layer 74a, wherein they are subsequently developed by the developer to give a positive image in silver.

Liquid-containing means 38 is separated from layer 74a after the formation of the positive image in the latter. Layer 74a is preferably formed of a transparent material, such as gelatin, methyl cellulose, cellulose, or hydroxyethyl cellulose, so that the silver image formed therein by the above method produces a transparency. If it is desired to provide a white background against which the image is visible, so as to give a conventional positive print, there is preferably incorporated in layer 70a a reagent which reacts with a compound contained in the liquid reagent to form a dense white precipitate.

Figure 5:
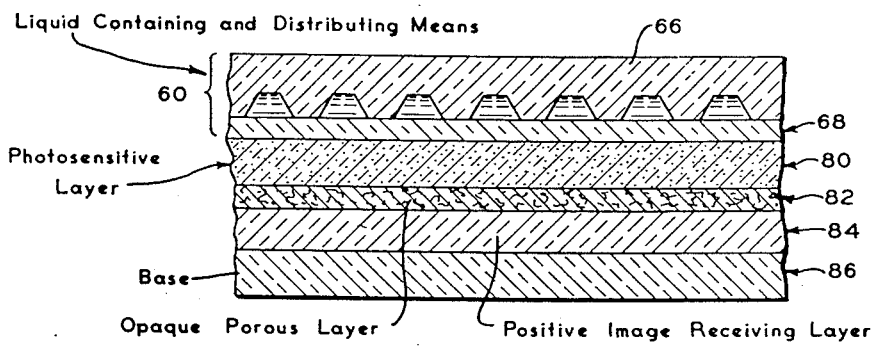
Fig. 5 is a view like Fig. 4 of still another form of the product of the present invention.
Figure 6:
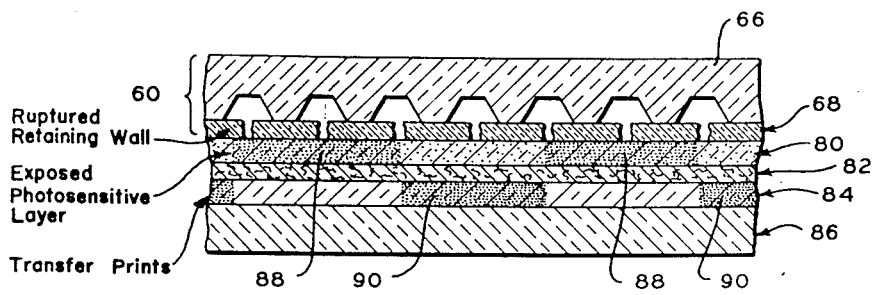
Fig. 6 is a view similar to Fig. 5 showing the product of Fig. 5 after the release of the liquid.

In each of the foregoing films, the layer in which the positive image is formed is stripped from the portion of the film containing the photosensitive layer. Novel film means may also be provided in accordance with the invention whereby a positive print is obtained without requiring the separation of any of the film layers from one another. One embodiment of means of this character is shown in Figs. 5 and 6 and comprises liquid-containing means 60 on membrane 68 of which there is provided a layer 80 of photosensitive material. A layer 82 of relatively opaque material adjoins layer 80 and separates the latter layer from a layer 84 of clear gelatin, regenerated cellulose, i. e., cellophane, polyvinyl alcohol, or other material in which the positive image is adapted to be formed. Layer 82 preferably has a black surface adjoining layer 80 to constitute an antihalation base for the latter layer and the surface, adjoining layer 84 and visible therethrough, is either black or white, depending on the method used for forming the positive image. If desired, a transparent base 86, for example of film base plastic, may be superimposed on layer 84 to constitute a protective face for the positive print. In a preferred embodiment of this film, layer 82 may be formed, for example, of a material such as a white paper and the surface layer thereof adjoining layer 80 may be dyed with a fast, dark, preferably substantially black dye, the surface layer thereof visible through layer 84 being white. The liquid reagent provided by means 60 comprises a tanning developer for layer 80. There is preferably dispersed throughout layer 80 a compound adapted to react with a compound in said reagent to form a dye substantive to tanned gelatin. In use, layer 80 is differentially exposed and after exposure membrane 68 is fractured to permeate said layer with the liquid reagent (Fig. 6). The above compounds uniformly dye said layer and the developer tans the gelatin at exposed areas 88, which retain the dye. The untanned gelatin in the unexposed areas does not retain the dye which migrates through layer 82 into layer 84 to dye corresponding areas 90 of the latter layer to form the positive image. The latter is visible through base 86 and is corrected for geometric reversal.

Figure 7:
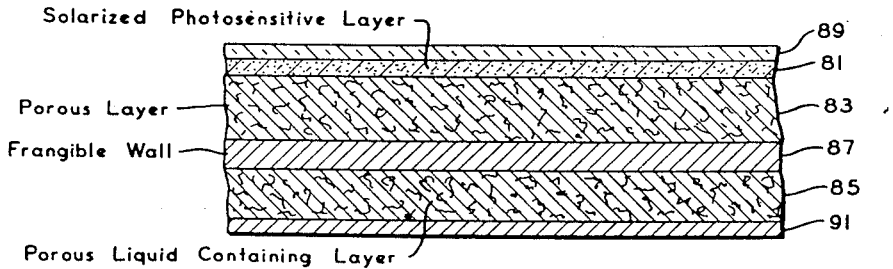
Fig. 7 is a view similar to Fig. 2 of still another modification of the product of the present invention.

A film for carrying out the methods wherein the positive image is formed in the carrier of the photosensitive layer is shown in Fig. 7, and as shown comprises a photosensitive layer 81 formed, for example, of a solarized silver halide emulsion, and a base 83, for example of relatively porous paper. Any of the foregoing liquid-containing means may be employed in conjunction with said layer and said base to provide a desired liquid reagent for permeating said layer. For example, a liquid-retaining member 85, similar to sheet 40 of liquid-containing means 38, may be provided adjacent base 83 and is separated therefrom by a frangible liquid-retaining wall 87. A transparent layer 89 is preferably provided as an outer coating for layer 81 and may be connected by suitable edge seals to a layer 91 on the outer face of member 85, said layers and said edge seals being formed of a vapor-impervious material to provide a vapor-retaining envelope for the liquid-containing means.

Figure 8:
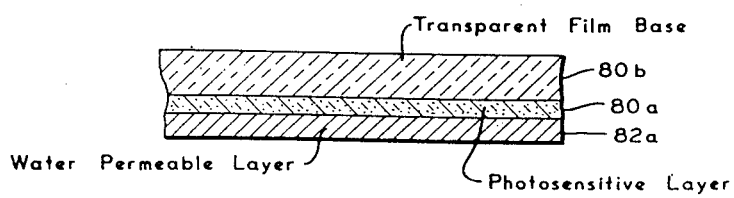
Fig. 8 is a view similar to Fig. 5 of a product useful with any of the liquid-containing means of the invention.

A further modification of the film means of the invention is shown in Fig. 8, and as illustrated comprises a photosensitive layer 80a preferably mounted on a transparent film base 80b. A water-permeable layer 82a containing relatively white and opaque pigment, such as titanium dioxide, is coated on said photosensitive layer. If desired, an antihalation coating may be provided between layers 82a and 80a, as well as a protective outer coating for layer 82a, for example, of a suitable transparent and preferably permeable plastic. Any of the liquid-containing means of the invention may be used in conjunction with the film, being preferably located on the pigment side of the film and secured to said film so as to be readily separated therefrom after the liquid is released. Layer 82a may also be formed of a water-permeable material, such as gelatin or regenerated cellulose, impregnated with the white pigment.

Any of the foregoing methods may be utilized to form an image-forming component in layer 80a and to transport said component from said layer to layer 82a wherein said component forms a positive image. In a preferred form of the invention, layer 80a is a silver halide gelatin emulsion which is exposed through base 80b and then permeated with a liquid reagent comprising a developer, e. g., hydroquinone, and a substance, e. g., sodium thiosulfate, for forming a soluble complex with silver halide. The soluble silver complex is transported from layer 80a into layer 82a and is reduced therein by the developer to form a silver image in the latter layer. Layer 82a not only provides a white background for the silver, but also serves as an optical screen which renders layer 80a invisible from the pigment side of the film.

Figure 9:
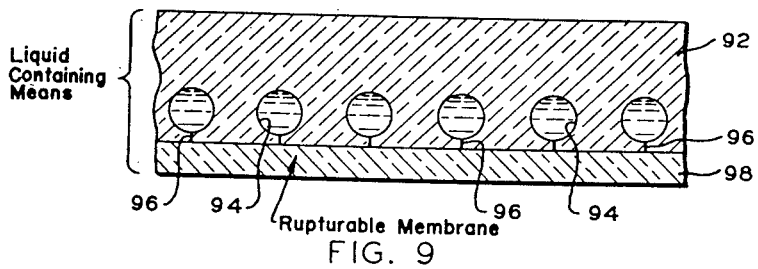
Fig 9 is a view similar to Fig. 2 of a modification of the liquid-containing means of the latter figure.

A modified form of liquid-containing means 60 is shown in Fig. 9 and comprises a sheet 92, for example, of film base provided with a plurality of chambers or cells 94, each of which is connected by a self-sealing slot 96 to the bottom wall of said base. Slots 96 form temporary seals for said cells and a more permanent seal is provided by a frangible membrane 98 formed of a relatively brittle material and adapted to function in the same manner as membranes 42 and 68 of liquid film-retaining means 38 and 60, respectively. When the side of film 92 containing slots 96 is subjected to sufficient tension to fracture sheet 98, slots 96 are also opened and the liquid contained in cells 94 is released.

Figure 10:
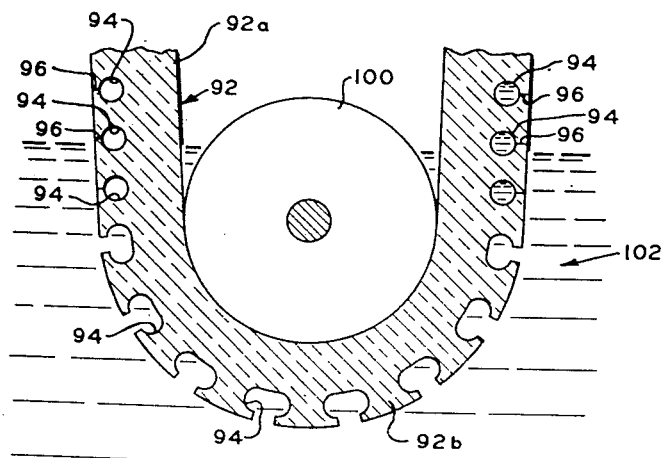
Fig. 10 is a diagrammatic view, partly in section and partly in elevation with parts broken away, of apparatus whereby the cells of the fluid-retaining member of Fig. 9 may be filled.

The cells 94 of the retaining means of Fig. 9 may be filled with the liquid in any of several ways and one novel method comprises causing film 92 to travel over a roll 100 (Fig. 10) with the side thereof containing slots 96 on the outside, the tension on said film being insufficient to cause slots 96 to open in the straight portions 92a thereof. Throughout the length of the curved portion 92b of said film, the outside surfaces are stretched a substantial amount so as to fully separate the walls of slots 96, and cells 94 remain open during the travel of the base around the roll until said base is again traveling in a straight line. Roll 100 is immersed in a bath 102 of the liquid so that all of curved portion 92b of base 92 is immersed in said liquid as well as short lengths of straight portions 92a of said film adjoining both ends of the curved portion. Cells 94 are thus filled during the curved travel of film 92, and because the straight travel of the film is resumed before the latter emerges from bath 102, said cells are sealed prior to their emergence from the said bath and trap the liquid therein. The cells are thereafter permanently sealed by applying membrane 98 to film base 92. Various other methods may, of course, be used for filling the cells with the liquid.

It will be noted that in each of the film structures described in Figs. 1, 3 and 4, as well as in the modified liquid-containing means of Fig. 9, the liquid is released for saturating the photosensitive layer by fracturing a frangible liquid-retaining membrane. This may be accomplished by forming the membrane of a relatively more brittle material than the other layers of the film so that the fracturing of said membrane can be achieved by subjecting the film to a tension which is beyond the yield point of said membrane and below the yield point of any of the other layers of the film. Novel camera means for use in connection with the films of the present invention, and embodying means for effecting the release of the liquid in this manner, is shown diagrammatically in Fig. 11 and comprises means for operatively mounting, for example, a roll 110 of one of the films F of the invention, and shutter and lens means 112 of a conventional type adapted to effect exposure of a frame of said film. To release the developer and assist in the metering of the film after each exposure, two pairs 114 and 116 of laterally spaced rolls may be provided, each pair frictionally engaging said film to positively drive the latter and each being positively driven by the camera winding mechanism (not shown) which may be manually actuated. The leading pair of rolls 116 is adapted to drive the film at a higher linear velocity than the other pair 114, whereby film portion 118 between said rolls is subjected to a sufficient tension to fracture the liquid-retaining membrane. Rolls 116 also compress the film and thereby tend to insure a complete discharge of the liquid from the containing means therefor. After rolls 116 have metered the exposed frame therethrough, the actuating mechanism renders operative a film-cutting means 119 which cuts the exposed frame from the remainder of the film. The film as it travels from rolls 116 to the point at which it leaves the camera is guided by suitable guideways (not shown) and the travel is generally sufficient to insure development of the exposed area and formation of the positive print. An opening 120 is provided for discharging the cut film frame from the camera and if either of the films of Figs. 1 and 3 is used, the positive print material may then be stripped from the remainder of said film frame to provide the positive picture. It is to be understood that this stripping may be accomplished by suitable means within the camera so that the separated portions of the film issue from the camera. Each exposed frame may thus be developed and a print thereof formed without requiring that the remainder of the film be exposed. It will be apparent that in order to minimize the length of film between exposed frames, cutting means 119 should be located as closely as possible to the point at which the leading edge of each frame is exposed.

As pointed out hereinbefore, certain of the film means of the invention, for example the film illustrated in Fig. 3, gives a positive print which is not corrected for reversal. Accordingly, for film means of this character, novel camera means may be provided wherein there is effected a geometric reversal of the image prior to its projection on the film frame so that the positive image obtained from said projected image is properly corrected. One embodiment of camera means of this character is shown in Fig. 12, and, as shown, comprises a lens 112a and suitable means, for example, similar to that shown in Fig. 11, for mounting the novel film F so that a frame thereof may be exposed and after exposure may be subjected to mechanical stress in order to release the liquid reagent for developing the latent image in said frame and for forming a positive image thereof. To reverse the image projected on film F, a mirror 121 may be provided and is located with relation to lens system 112a and the plane of film F so as to reflect and reverse light transmitted through said lens before it reaches said film. As shown, mirror 121 is located in a plane disposed at an angle of substantially 45° to the optical axis of lens system 112a.

Figure 11:
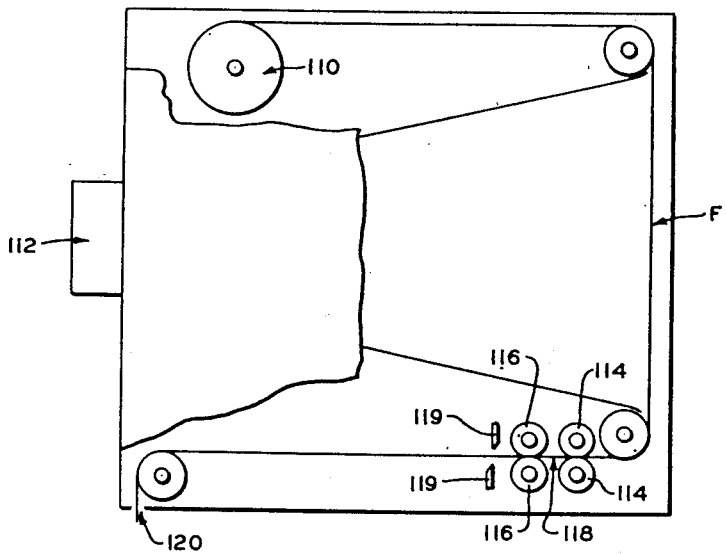
Fig. 11 is a diagrammatic view, in elevation with parts broken away, of one embodiment of camera means suitable for forming a positive print in the product of the present invention.
Figure 12:
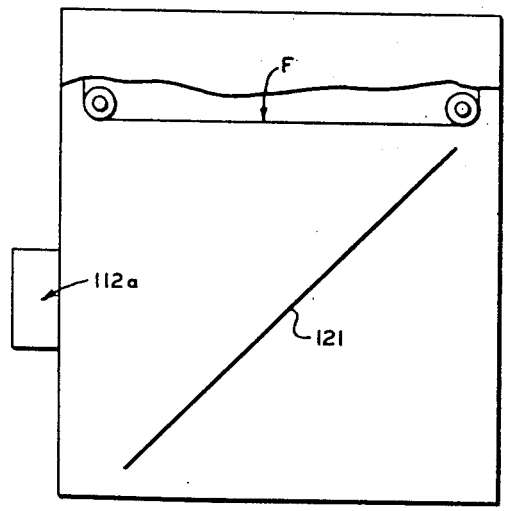
Fig. 12 is a view similar to Fig. 11 of a modified form of said camera means.

It is to be understood that the camera of Fig. 11 may be provided with a suitable attachment affixed in front of the lens thereof, said attachment comprising optical means, such, for example, as an arrangement of prisms or mirrors, for reversing the light entering the lens so as to geometrically reverse the image formed on the exposed film by means of the lens.

In the camera of Fig. 11, rolls 114 and 116 operate to uniformly stretch the portion of film therebetween, but it is to be expressly understood that the liquid-retaining membrane can be fractured in various other ways, for example the various layers of the film may be subjected to a differential stretching as by causing the film to travel under tension over a cylindrical roll or drum whose surface curvature is such that the membrane will be stretched sufficiently to fracture during this travel over said roll or drum. The film may thereafter be compressed for the purpose of insuring complete release of the liquid from the liquid-retaining means as by passing said film between a pair of friction rolls.

Figure 13:
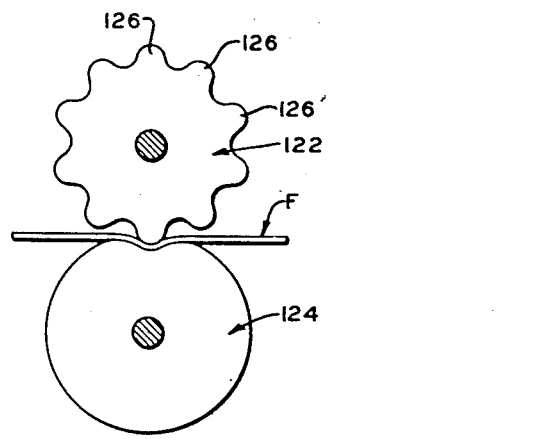
Fig. 13 is a fragmentary, diagrammatic view in elevation of novel means for fracturing the liquid-retaining membrane of the product of the invention.

Novel means for fracturing the membrane and causing release of the liquid are shown in Fig. 13 and comprise a pair of rolls 122 and 124 between which film F is adapted to travel. Roll 122 is preferably formed of a rigid material, such as metal, and is provided with a plurality of surface corrugations 126 and roll 124 is formed of a yielding material, such as rubber, and has its axis of rotation located with respect to the axis of rotation of roll 122 so that the periphery thereof is substantially compressed by corrugations 126 in order for rotation of said rolls to take place. Accordingly, when film F is metered between said rolls, successive lengths thereof are subjected to differential stretching, insuring at least one fracture of the liquid-retaining membrane for each predetermined unit length of the film. This unit length, i. e., the maximum distance separating fractures, may be readily controlled by controlling the radius of curvature and spacing of corrugations 126 on roll 122.

It will be apparent that by controlling the thickness of the several layers, it is possible to locate the liquid-retaining membrane of any of the foregoing liquid-containing means substantially closer to one face of the film than to the other face. As a result of this arrangement, said membrane may be subjected to compression when the film is wound in one direction, and to tension when the film is wound in the other direction, the tension being sufficient to fracture the membrane. In a film of this character, the liquid is retained in the liquid-containing means whenever the film is wound in one direction, and is released whenever the film is wound in the other direction.

Where the novel film of the invention is to be used in roll form, it may be possible to employ instead of a highly vapor-impervious material, such as paraffin, a water-impervious material which is somewhat less vapor-impervious than paraffin, but which, in sufficient thickness, will act to prevent vapor loss. Satisfactory materials for this purpose are polyvinylidene chloride, polyvinyl acetate-chloride, and even cellulose acetate butyrate. When the film is wound as a roll, there is provided, in effect, a plurality of layers of the vapor-resistant material which, in aggregate, act to prevent any appreciable vapor loss from the roll. An arrangement of this sort will protect a roll from vapor loss for a relatively long time, although with the passage of time one or more frames of the outer layers may lose a substantial amount of their liquid content by vaporization.

A further preferred form of the invention is shown in Figs. 14 to 17 and comprises novel means for releasably containing a liquid which is preferably viscous and which is adapted when released to permeate a predetermined area of a photosensitive layer to process the same. In the form illustrated in Fig. 14, a photosensitive layer is an element of the composite product and the product is adapted to carry out any of the foregoing methods whereby a transfer print is obtained.

The liquid in the container may comprise a film-forming material such as a high polymer so that upon release the container contents, in addition to providing the liquid for carrying out the desired processing, also form throughout the area over which they are distributed a layer of film-forming material which eventually solidifies to give a solid film. This film-forming component of the liquid contents of the container may serve as the thickening agent for imparting the desired high viscosity to said contents.

The film obtained from the film-forming reagent may serve as the layer in which the transfer print is formed, or may cooperate with another layer to provide the print-receiving stratum. Moreover, although a film-forming reagent is used, the transfer print may be entirely formed elsewhere than in the film formed by the reagent as by selecting for the material of one of the other layers of the composite structure a substance wherein the image-forming component for producing the transfer image is more readily precipitated.

The invention also comprehends a product of sheetlike structure which preferably comprises a base and containing means for the liquid reagent and does not include a photosensitive layer as an element thereof, but is so constructed that when pressed into face-to-face contact with the photosensitive layer it releases the liquid reagent to cause the processing of the photosensitive layer.

Referring to Fig. 14 there is illustrated by way of example one form of the novel film means of the present invention, and, as illustrated, said film means comprises a film base 210 formed preferably of a transparent plastic material as, for example, a cellulose ester or mixed ester, such as cellulose acetate, cellulose nitrate, cellulose acetate propionate, or cellulose acetate butyrate. Base 210 supports a layer 212 of photosensitive material of the type which is rendered developable by exposure to light, such as a silver halide or a mixed silver halide "emulsion." Mounted adjacent layer 212 is an image-receiving layer 214 formed of a water-permeable material as, for example, regenerated cellulose, polyvinyl alcohol and other high molecular weight, film-forming polyhydroxy alkanes, sodium alginate, certain of the cellulose ethers such as methyl cellulose, and their derivatives such as sodium carboxymethyl cellulose or hydroxyethyl cellulose, papers, proteins such as gelatin or glue, carbohydrates such as gums or starch, and mixtures of these materials where the latter are compatible. If the reagent contains a film-forming thickening agent, layer 214 may be selected from those materials which have an affinity for the film.

It may be desirable that layer 214 and/or the film formed by the liquid reagent be nontransparent, and it is possible to form a white and substantially opaque layer by incorporating in the materials used for film 214, or as the film-forming component of the liquid reagent, a suitable pigment, as, for example, titanium dioxide.

Receiving layer 214 is mounted on a base 216 which may be any suitable base material such as a cellulose plastic, a nylon-type plastic, a polyvinyl plastic, or paper.

To releasably contain the liquid reagent, the novel composite film of the invention is preferably provided with one or more elongated containers 218 in the form of sacs or pods which are mounted preferably transversely of the film and between layers 212 and 214. Each contains a sufficient quantity of liquid reagent to permeate a frame of the photo-sensitive layer of the composite film and is adapted to release said reagent longitudinally in only one direction. One of sacs 218 is provided for each film frame, preferably adjacent the leading or trailing edge of said frame. The composite film comprising these several layers and the container may be provided in the form of a roll or a film pack or in single frames. Sacs 218 are preferably so formed that the application of suitable mechanical stress thereto, as for example the squeezing together of the faces of the composite film, releases the liquid reagent in the direction of the exposed frame. This may be accomplished by forming pods 218 as shown in Figs. 14 and 15 of a single sheet of oxygen and water-vapor-impervious material such, for example, as a sheet of wax-impregnated, metal-coated paper or wax-coated metal foil. A strip of said sheet is folded over and one face of the fold is subjected to a suitable forming operation whereby a cavity 222 (Fig. 16) is obtained therein. This cavity is thereafter filled with the liquid reagent and the faces of the sheet are folded into engagement with one another and the edges sealed as by the application of heat. To exclude oxygen, the cavity is completly filled or the filling operation is carried out in an inert atmosphere. The seal is such that it will break before the folded edge will fracture, so that upon application of pressure to the sac the liquid is released from the side of the sac containing the seal. The seals at the end of the sac are preferably formed so as to offer a greater resistance to separation than the longitudinal seal. There is thus obtained a water-vapor-impervious container whose contents for relatively long periods will neither become dry nor oxidize.

To insure a complete and relatively uniform permeation of the exposed frame of the photosensitive layer upon release of the reagent, the reagent is relatively viscous, preferably having a viscosity in excess of fifty centipoises. A reagent having a viscosity less than fifty centipoises may be used in some instances, but a reagent substantially less viscous may be too greatly absorbed in some portions of the photosensitive layer, while other portions remain relatively dry.

To impart the desired viscosity to the reagent, a suitable thickening agent may be used, and in a preferred form the thickening agent is a water-soluble, film-forming material, preferably a high molecular weight polymer or protein as, for example, gelatin, or a polymeric water-soluble ether inert to an alkali solution, such as hydroxyethyl cellulose or a metal salt of carboxymethyl cellulose, e. g., sodium or aluminum carboxymethyl cellulose, which, when spread over a water-absorbent base while in contact with a photosensitive layer, quickly forms a relatively firm, dimensionally stable film.

In use, the silver halide emulsion 212 is exposed through base 210 to predetermined subject matter in order to form in said emulsion a latent image of said subject matter, and after exposure the film is subjected to a compressive force, as, for example, by being metered between suitable pressure rollers. The compression releases the reagent 220 contained in pod 218 and spreads said reagent between layers 212 and 214 in the direction of the exposed portion. This completely permeates at least the surface portions of layers 212 and 214 within the exposed frame.

It will now be apparent that by suitably arranging and forming the several layers of the above film, and by properly selecting the composition of reagent 220, all of the hereinbefore described transfer methods may be carried out with the film. To illustrate by way of example the use of the novel film for carrying out one of these methods, liquid reagent 220 is preferably formed so that its ingredients comprise a developer for reducing exposed silver halide to silver and a compound for reacting with the undeveloped silver halide to form a silver complex soluble in the reagent. The reagent also preferably contains an alkali and a suitable thickener as, for example, a high molecular weight, i. e., colloidal, compound such as a starch, sodium alginate, sodium carboxymethyl cellulose, hydroxyethyl cellulose or polyvinyl alcohol, and may contain a restrainer and a preservative.

Examples of suitable reagents of this type are given below, but it is to be expressly understood that the examples are illustrative only and that the invention is not limited to the materials or the proportions set out therein.

*Example 2*

| | | |
|---|---|---|
| Water | cubic centimeters | 100 |
| Sodium sulfite | grams | 7 |
| Hydroquinone | do | 3.3 |
| Sodium thiosulfate | do | 1.4 |
| An aqueous solution of medium viscosity sodium carboxymethyl cellulose consisting of 20 g. of the latter compound in 100 cc. of water | grams | 5 |
| Sodium hydroxide, 10% solution | cubic centimeters | 11.2 |

The sodium sulfite, hydroquinone, and sodium thiosulfate are dissolved in the water, and the sodium carboxymethyl cellulose solution is then added and thoroughly mixed therewith. The solution thus obtained is cooled to a temperature between 65° and 75° F. and thereafter the sodium hydroxide solution is added thereto.

An alternative method of obtaining the above reagent is to first dilute the sodium carboxymethyl cellulose solution with the water and thereafter add the sodium sulfite, hydroquinone, and sodium thiosulfate. The mixing of these ingredients may be carried out at a temperature between 80° F. and 90° F. and after the components are thoroughly mixed, the mixture may be cooled to a temperature of approximately 65° to 75° F. and the specified quantity of sodium hydroxide solution added thereto.

The proportions of the ingredients set out above may be varied within relatively wide limits as, for example, quantities of hydroquinone up to 6.6 grams may be used. Similarly, the quantity of sodium thiosulfate may be varied from 1.4 to 2.8 grams, and the amount of sodium hydroxide solution from 11 to 44 cc. While it is preferred to omit the preservative from the novel reagents of the invention, satisfactory results may be obtained by including, for example, 2.2 to 6.6 grams of potassium bromide in the solution of the above example.

*Example 3*

| | |
|---|---|
| Water | cubic centimeters 150 |
| Hydroquinone | grams 2.8 |
| Sodium sulfite | do 20 |
| Metol | do 1.55 |
| Sodium thiosulfate | do 10 |
| Aqueous solution of medium viscosity sodium carboxymethyl cellulose consisting of 20 g. of the latter compound in 100 cc. of water | grams 100 |
| Sodium hydroxide | do 5.6 |

Sodium alginate may be used instead of sodium carboxymethyl cellulose in either of the above examples in the same relative amounts as sodium carboxymethyl cellulose. Many of the starches as, for example, Merck's starch, Argo starch, Maine potato starch and Brazilian starch may also be used, and it is preferable when using these starches to employ a concentration approximately twice that of the sodium carboxymethyl cellulose suggested above.

If a relatively white and nontransparent film is to be formed by the reagent, there may be incorporated in said reagent a suitable pigment such as titanium dioxide or mixtures of titanium dioxide and magnesium oxide or magnesium carbonate. The addition of titanium dioxide equivalent to from 10 to 20% by weight of the reagent has given good results. These pigments also serve as fillers for increasing the viscosity of the reagent.

Examples of other developers which may be used in the reagent are p-aminophenol hydrochloride (Kodelon), p-hydroxyphenylamino-acetic acid (Athenon, Glycin), p-phenylenediamine, pyrocatechin, diaminophenolhydrochloride (Amidol), pyrogallol, o-phenylenediamine and bromohydroquinone.

Examples of other materials which may be used in the reagent for the purpose of forming a soluble silver complex with the undeveloped silver halide of the photosensitive layer are ammonium thiosulfate and ammonia. For obvious reasons, it is preferable that the complex-forming substance be one which does not desensitize the silver halide emulsion and one which is not toxic. For example, a compound such as sodium cyanide which will give satisfactory photographic results when used in the reagent in accordance with the methods of the invention is generally not desirable because of its toxic character.

The liquid reagent may also contain other accelerators, as for example potassium hydroxide, sodium carbonate, borax, sodium metaborate, paraformaldehyde, trisodium phosphate or Triton B. The last-named alkali, a Rohm and Haas product, is a 40% aqueous solution of benzyl trimethyl ammonium hydroxide. In certain modifications of the reagent composition, the preservative and the restrainer may be omitted.

To practice the method, photosensitive layer 212 is differentially exposed, for example in a camera, through base 210 to predetermined subject matter so as to form in said layer a latent image of said subject matter. The film is then subjected, in the absence of actinic light, as for example in the camera or in a dark room, to compression or any other application of stress whereby the liquid reagent in container 218 is released from said container and caused to permeate the photosensitive layer and the receiving layer. The exposed silver halide, at least in the portions of the photosensitive layer adjacent the receiving layer, is developed to silver and a portion of the unexposed silver halide is transformed to the soluble silver complex which is transported at least in part to the receiving layer. This soluble complex is reduced in receiving layer 214 to an insoluble product comprising silver, said product forming in said receiving layer a positive image of the subject matter to which the photosensitive layer was exposed.

The thickening agent in the reagent forms a film on the receiving layer and accordingly the insoluble reduction product which provides the positive image is contained at least in part in said film. After the formation of the positive image, layer 214, the film formed thereon by the reagent, and base 216 are separated from the photosensitive layer.

If a transparency is desired, base 216 as well as layer 214 is formed of transparent materials, but if a conventional positive print, i. e., an image visible against a white nontransparent background, is desired, base 216 is preferably formed of a relatively nontransparent, white material. For example, base 216 may be a pigmented cellulosic plastic such as Kotavachrome base, paper, or opal cellulose acetate.

It is less preferable, but also possible, to use as layer 214 a sheet of relatively water-permeable, nontransparent and preferably opaque white material adapted to adhere to the photosensitive layer 212, and sufficiently thin so that the complex silver ions in the reagent may permeate through said layer to the surface thereof remote from the photosensitive layer to form, when reduced, an image visible from the latter surface of said layer. In the latter case, if base 216 is transparent, it is unnecessary to separate said base from layer 214 since the positive image is visible through said base, and layer 214 acts as a barrier to render layer 212 and the developed silver contained therein invisible.

Where the reagent contains a thickening agent adapted to form a film, the separate receiving layer 214 may be omitted and the film formed by the reagent used for receiving all of the complex silver ions transported from layer 212. In this modification of the film, it is preferable to use as base 216 a material having a greater affinity for the film-forming material of the reagent than for the photosensitive layer. A suitable base of this character is pure alpha paper where the film-forming material is any one of the starches, sodium alginate or sodium hydroxyethyl cellulose mentioned above. It is also possible to use substantially all of the plastic, paper and other sheet materials mentioned hereinabove for base 216, provided these materials are first subcoated on the side which is to adjoin the photosensitive layer with a film of the film-forming material in the reagent.

To carry out another method for forming a positive image, liquid reagent 220 comprises a developer which tans the carrier for the photosensitive material of layer 212 wherever development of said material takes place, and also contains a compound which is adapted to react with a compound dispersed throughout layer 212 to form in said layer a dye which is substantive to the tanned carrier. When the liquid reagent permeates the photosensitive layer, said compound reacts to form the dye throughout layer 212, and wherever development of the latent image takes place, i. e., where the carrier is tanned, the dye is attracted and retained, whereas wherever no development takes place, the dye migrates to the receiving layer and forms therein the desired positive image. In a preferred modification of this embodiment of the invention, the developer also serves as the compound which reacts with the compound in the photosensitive layer to form the dye. For example, pyrocatechin may be the developer and p-phenylenediamine may be the compound contained in the photosensitive layer which reacts therewith to form the dye.

In a modification of the invention, there is provided a unitary sheetlike product 224 (Fig. 17) comprising base 216 and containers 218 and adapted to be used with any developable photosensitive layer containing a latent image to produce a positive image corresponding to the subject matter of said latent image on base 216. Base 216 is shown with a receiving layer 214 but the latter may be omitted in the event reagent 220 contains a film-forming material and it is desired to form the positive image in the film obtained from said material.

In use, composite sheet 225 is pressed into face-to-face contact with an exposed photosensitive layer of, for example, a conventional negative film in such a manner that containers 218 are caused to release the reagent and the latter is spread over the entire exposed frame of said photosensitive layer, causing a fixed positive image to be formed on base 216. Sheet 224 may be used either in a darkroom after the exposed photosensitive film is removed from the camera or in the camera so that a fixed positive image is obtained shortly after exposure.

A modified form of the film and composite sheet material of the above-described embodiment may be used whereby it becomes unnecessary to keep the unit formed of said sheet material and film in the darkness of the camera after exposure. For example, the photosensitive film may have its photosensitive layer supported by a sheet of opaque material such as black paper, and the sheet material carrying the reagent may be provided with a backing of relatively opaque material. Light is thus excluded from the unit formed of the exposed film and the sheet material when the two are brought into operative engagement, and said unit may pass directly out of the camera, after being assembled, into the light without deleteriously affecting the image-forming reaction.

It is to be understood that containers 218 may be provided as units separate from base 216 in the above-described embodiments, said containers being operatively positioned between said base and the photosensitive film as the latter are pressed together after exposure of said film. This may be accomplished in the camera by equipping the latter with suitable dispensing means for the containers operatively connected to the film-metering mechanism of the camera. Containers 218 may also be manually positioned between the exposed photosensitive layer and base 216 as the latter are operatively pressed together, for example, between a pair of squeegee or wringer rollers, in a dark room.

The film-forming material when used as an ingredient of the liquid reagent is preferably a high molecular weight polymer which imparts to the composition the desired viscosity and which is of such character as to retain its viscosity-imparting and film-forming properties in the liquid material for the length of time that is to elapse between the mixing and the use of the viscous liquid. Where it is desired that the liquid material once mixed and in equilibrium remain uniformly viscous for any given temperature, the film-forming material is preferably one of the class of high molecular weight polymers which include in their chemical structure such groups as, for example, the ether, alkyl, hydroxyl, carboxyl, and acetyl groups that are stable to alkalis and which contain none of the chemical groups, such as the ester and acid chloride groups, that are unstable to alkalis. The polymers also contain groups such as the hydroxyl and/or carboxyl groups which tend to solubilize in aqueous alkaline solutions. Suitable examples of such polymers are the alkali-inert and water-soluble cellulose derivatives such as sodium carboxymethyl cellulose and hydroxyethyl cellulose, and the alkali-inert and water-soluble polyalkane derivatives such as the sodium salts of polymethacrylic acid and polyacrylic acid.

It is to be understood also that by a suitable selection of the film-forming material in liquid composition 220 (Fig. 14) the solid film or layer which is formed therefrom may be caused to adhere to either the photosensitive emulsion 212 or the surface of image-receiving layer 214 when and if the latter are peeled apart subsequent to the processing. For example, if the film-forming material is the plastic sodium carboxymethyl cellulose and layer 214 is a paper such as a baryta paper, the solid film of sodium carboxymethyl cellulose, when formed, will have a greater affinity for the surface of layer 214 than for the gelatin of emulsion 212, provided, of course, that the latter is an ordinary emulsion comprising the usual partially but not fully hardened gelatin and the liquid in the composition does not complete the hardening thereof. In general, the sodium carboxymethyl cellulose film will adhere to the harder of two layers of gelatin between which it is spread. Accordingly, if the surface of any image-carrying layer is provided with a thin coating of a substantially fully hardened gelatin, the film of sodium carboxymethyl cellulose will adhere to said image-carrying layer in preference to the relatively softer gelatin layer of the photosensitive emulsion.

A high viscosity for the liquid-processing agent is very desirable for any commercial use of the container 218 and its contents. In view of the order of nonuniformity of commercially available materials and of the pressure-applying means to be used in the release and spreading of the composition, for commercial purposes the film-forming material is preferably contained in the composition in suitable quantities to impart to the composition a viscosity in excess of 1,000 centipoises at a temperature of approximately 24° C. and preferably of the order of 1,000 to 200,000 centipoises at said temperature.

It is to be understood that the construction of the container 218 may be modified, for example, by omitting the preforming of the cavity 222. One example of a suitable container of this type is formed from a single multilayer sheet of material 230 (Fig. 18) comprising three layers 230a, 230b, and 230c. Layer 230a, which provides the internal surface layer of the container, is formed of a material which is chemically inert to the processing agent and which is impervious to the liquid of the agent. One class of materials suitable for this purpose is the polyvinyl acetals, and of the acetals, polyvinyl butyral is a preferred species. A composition comprising 60% to 72% by weight of polyvinyl butyral, 10% to 23% by weight of ½″ nitrocellulose, and approximately 5% by weight of dibutyl sebacate is particularly satisfactory as inner coating 230a. Layer 230b contiguous to layer 230a is preferably impervious to the vapor of the processing agent and is formed, for example, of a metallic foil, such as lead or silver foil. Backing layer 230c, for example of kraft paper, is provided and makes possible the use of thinner layers 230a and 230b.

Figure 18:
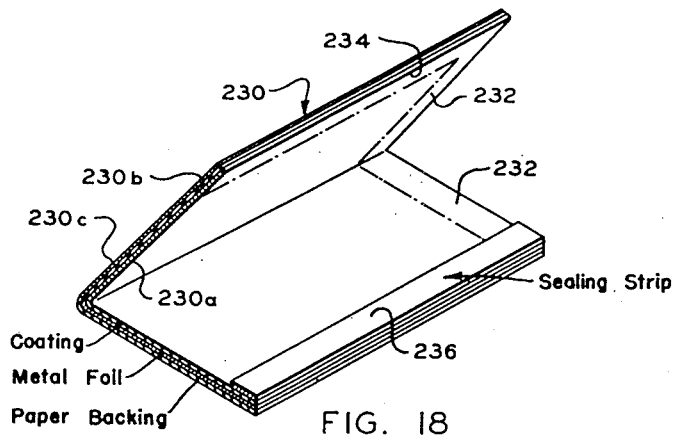
Fig. 18 is a fragmentary, enlarged, perspective view illustrating the construction of another form of the container means which may comprise part of the novel composite product of the invention.
Figure 20:
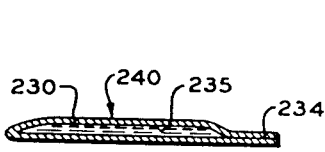
Fig. 20 is a sectional view taken along line 20—20 of Fig. 19.
Figure 19:
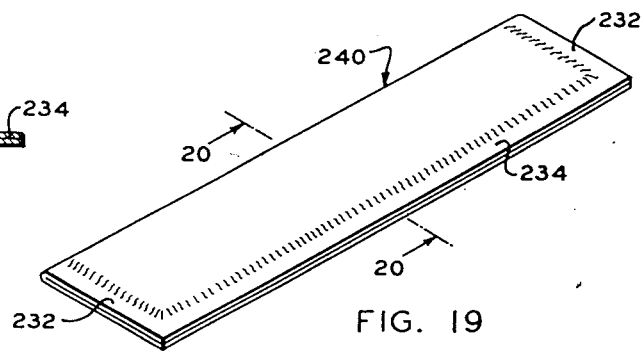
Fig. 19 is a perspective view of the filled container.

The container 240 (Fig. 20) is preferably formed by taking the single sheet of material 230 and folding the same medially as shown in Fig. 18 and thereafter securing the end marginal portions 232 and the longitudinal marginal portions 234 of the two fold faces to one another, providing a central space 235 (Fig. 20) for containing the processing agent.

To fill the container, it is possible, for example, to adhere together the opposite longitudinally extending marginal portions 234 and the end marginal portions 232 at one end only of the container, the container being thereafter filled through the other end.

The longitudinal seal between marginal portions 234 is such that upon application of a predetermined compressive force to the walls of the container there may be created within the container a sufficient hydraulic pressure to separate the marginal portions 234 throughout substantially their entire length. To insure this result, the bond securing together said marginal portions 234 is somewhat weaker than the bond which secures together end marginal portions 232. For example, the end portions may be secured by pressing the two polyvinyl butyral inner surfaces together and applying heat thereto while a sealing strip 236 may be inserted between the longitudinal marginal portions, which sealing strip is adapted to adhere to the inner layers of polyvinyl butyral with a lesser affinity than said layers adhere to one another in a direct polyvinyl butyral to polyvinyl butyral bond. Strip 236 may be formed of a material such as ethyl cellulose or a mixture of ethyl cellulose and paraffin.

Figure 21:
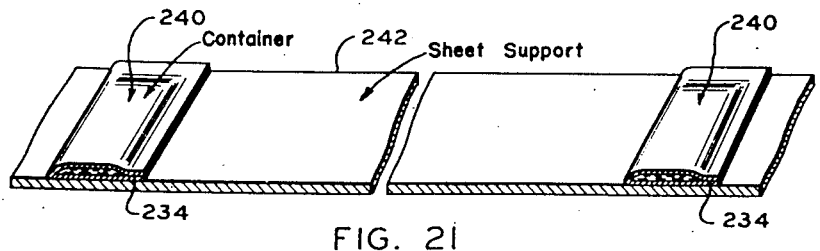
Fig. 21 is an enlarged, fragmentary, sectional view in perspective illustrating another form of the composite product of the invention.

One or more containers 240 may be associated with sheet material to provide a sheetlike product capable of subjecting one or more areas of a photosensitive film to a predetermined processing. One such sheetlike structure is shown in Fig. 21 and comprises a plurality of containers 240 mounted on the surface of an image-carrying layer 242 as by being adhered thereto with their longitudinal axes extending transversely of said layer.

Figure 22:
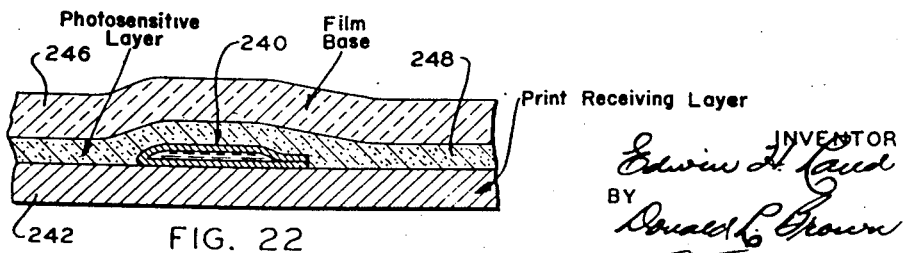
Fig. 22 is a longitudinal, sectional view showing still another composite product of the invention.

The sheetlike product comprising layer 242 may comprise a part of a composite photographic film (Fig. 22), which includes as a part of its unitary structure a transparent film base 246, a photosensitive emulsion 248 mounted on said film base and one of image-carrying layers 242. Containers 240 are thus located between said photosensitive emulsion and said image-carrying layer and are capable of discharging their fluid content throughout the interface area of said layers. This composite photographic film may be provided as a roll film, in the form of a film pack comprising a plurality of interconnected frames, or in single frames.

When the film-forming agent carried by container 240 is released therefrom and spread between a photosensitive emulsion such as emulsion 248 and an image-carrying layer such as layer 242, the two layers in contact with the thin layer of composition therebetween prevent the latter from oxidizing. It becomes possible, therefore, to employ higher concentrations of materials subject to oxidation in the processing agent when used in this manner than can be employed in compositions when used, for example, in the ordinary developer bath which have a substantial surface thereof exposed to oxygen.

Moreover, the presence of the film-forming material in the liquid composition carried by the container 240 whereby the viscosity of the latter is substantially increased acts to insure an unsealing of the longitudinal edge 234 of the container throughout substantially the entire length thereof, when sufficient compressive force is applied to the container faces, thereby insuring the provision of a mass of the composition throughout said length free for spreading over the desired area.

While it is preferable to spread the liquid composition from container 240 over the photosensitive emulsion by introducing the conttainer between said emulsion and another sheet material and squeezing together said sheetts, the spreading may also be accomplished without the used of said other sheet material as, for example, by means of an applicator roll which engages and spreads the composition over the photosensitive emulsion and which preferably is so surfaced as not to adhere to the composition. An embodiment of a composite product suitable for such use would be the structure shown in Fig. 14 without layers 214 and 216, or the structure shown in Fig. 21 without layer 242. In the latter event the composition may be of the type adapted to form a white, opaque solid film when dry and may contain a sufficient quantity of silver halide solvent to cause the formation of a positive image in silver in the white layer, which image is visible from the surface of said white layer remote from the photosensitive layer. The white layer serves as an opaque barrier obstructing the negative from view and to provide the highlight portions of the positive.

Figure 23:
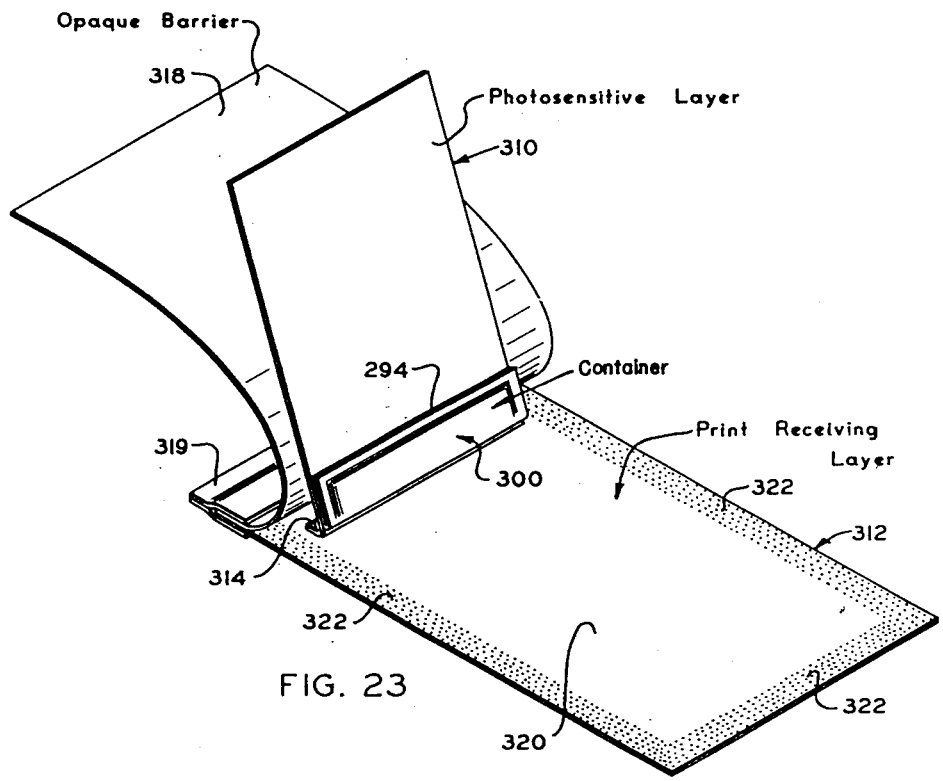
Fig. 23 is a somewhat diagrammatic, perspective view showing still another embodiment of the invention.

One further form of the composite film structure of the present invention is shown in Fig. 23 and comprises a photosensitive layer 310, an image-carrying layer 312 and a container 300.

Said layers and said container are connected together to form a unitary structure, the connection providing for a predetermined superpositioning of layer 310 with respect to layer 312 with container 300 in a position to discharge its contents between said layers. The unitary structure thus formed differs from the composite photographic films described above in that the connection between the photosensitive layer and the image-carrying layer is such as will permit of the ready displacement of said photosensitive layer with respect to the image-carrying layer so that the surface of the photosensitive layer normally adjacent the image-carrying layer can be directly exposed without having the light which effects said exposure intercepted by or incident on said image-carrying layer.

In the form illustrated, photosensitive layer 310 is pivotally secured as by means of a hinge 314 to image-carrying layer 312 so that it may be pivoted from superposed position to a position at an angle to the plane of said image-carrying layer, in which position it may be photographically exposed. Container 300 may be secured to either the photosensitive layer or the image-carrying layer and as shown is adhesively secured to the photosensitive layer. This mounting locates the longitudinal seal 294 of said container 300 parallel to and adjacent the exposed area of the photosensitive layer when the latter is superposed on layer 312, placing the container in a position to release its contents throughout the area between said photosensitive layer and said image-carrying layer.

Light barriers opaque to light that is actinic to the photosensitive layer are preferably associated with both the photosensitive layer 310 and the image-carrying layer 312. In the embodiment of the invention illustrated in the drawings, a separate layer 318 of, for example, a paper opaque to actinic light is provided as a backing layer for photosensitive layer 310. Backing layer 318 may be secured directly to said photosensitive layer but in the form shown is separate therefrom, being secured as by a suitable hinge 319 to the image-carrying layer. Image-carrying layer 312 may be similarly provided with an opaque backing layer but in the form shown is formed of or comprises as a stratum thereof an opaque material and is preferably substantially equal in area to backing layer 318, being thereby provided with an image-receiving area 320 substantially coextensive with layer 310 and marginal portions 322 surrounding said image-receiving area on at least three sides thereof. Marginal portions 322 may be provided with an adhesive for effecting a temporary bond with sheet 318 when the latter is superposed on said image-receiving layer or the container 300 may be made long enough to release part of its content over marginal portion 322 to obtain this same temporary bond.

It will be apparent from the foregoing construction that layer 310 may be readily exposed by pivoting the same with respect to image-receiving layer 312 and thereafter photosensitive layer 310 may be superposed upon layer 312 by causing barrier layer 318 to be pivoted into contact with layer 312. This encloses the photosensitive layer 310 in an envelope opaque to light actinic to said layer and permits of the handling of said envelope in daylight prior to or during processing of said photosensitive layer. The entire unit may be advanced through a pair of pressure-applying rollers or wringer rollers with the hinge end 319 foremost, to release and cause the liquid in container 300 to spread in a substantially uniform layer between the surface of layer 310 and area 320 of layer 312.

Figure 24:
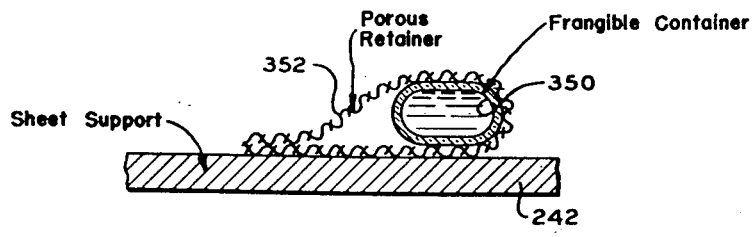
Fig. 24 is a fragmentary, enlarged, sectional view illustrating another form of the invention which embodies a novel modification of the container means.

A modification of the containing means 300 is shown in Fig. 24. It comprises a tube 350 formed of a relatively brittle vapor and liquid-impervious material such, for example, as glass, said tube preferably having its ends hermetically sealed as by fusion. Tube 350 is enclosed in a suitable envelope 352 of a material such as a fabric which is readily permeable to the processing agent carried by said tube but which acts as a filter for retaining the fragments of the tube after the latter has been broken.

In each of the products hereinbefore described there is provided a container for carrying a liquid in such condition that the liquid may be readily released for the purpose of processing a photosensitive layer. In the preferred embodiment of the product the photosensitive layer is a silver halide emulsion or the like, that is, an emulsion of a heavy metal salt capable of having a latent image formed therein upon exposure, which latent image may be rendered visible by suitable developing agents. The liquid released by the container cooperates with said emulsion and with another layer of material to carry out a transfer process. This transfer process involves the development of a latent image in the photosensitive emulsion and, in one preferred form, the removal from that emulsion of part at least of the undeveloped silver halide as a soluble complex, which soluble complex is transported from the photosensitive layer to form the positive print.

By so forming the products described hereinbefore as to omit therefrom the substances for forming the soluble complex, it becomes possible to only develop the photosensitive silver halide emulsion. Similarly, by eliminating the developer and if necessary increasing the concentration of the substance for forming a soluble complex, it becomes possible to predeterminedly fix out a developed negative by means of the afore-mentioned liquid-containing products. It is believed to be also evident now that other developable photographic materials may constitute the photosensitive layers which are processed, and that the product may carry suitable developing agents and such other liquid as is necessary to render said agents operative to effect the development of the photosensitive layer.

Certain diazonium compounds are destroyed by light and photographic processes involving such compounds as their photographic materials have been used commercially. There are several known ways in which a diazonium salt layer may be exposed and developed to produce a relatively stable image. In each of these processes the treatment of the photosensitive diazonium layer may be accomplished by applying thereto a liquid containing certain developing reagents. (L. P. Clerc, "Photography Theory and Practice," second edition, published 1937 by Pitman Publishing Company, page 444, paragraph 693.)

The products of the present invention may be used in conjunction with, or may comprise as elements thereof, diazonium photosensitive layers. For example, a photosensitive product may be formed by having the physical structure of the photosensitive element 310 of Fig. 23 with container 300 mounted thereon. The photosensitive layer of element 310 may have as its photosensitive substance a diazonium compound such as that sold by the Boston Blue Print Company under the trade name "Blackline #202," and the liquid reagent in the container 300 then preferably comprises, by weight, 4 parts of medium viscosity sodium carboxymethyl cellulose, 100 parts of water and 8 parts of "Blackline" developer #203-½ (sold by Boston Blue Print Company and manufactured by Frederick Post Company, Chicago). In the alternative the photosensitive layer of the photosensitive element 310 may be obtained by applying to one side of a suitable sheet material a sensitizing solution which consists of 20 grams of chlorostannate of para-diazo-di-N-butyl-aniline, 0.4 gram of Pontacyl Brilliant Blue 2R, and 1 liter of water. The liquid-developing reagent in the container 300 then preferably comprises, by weight, 4 parts of medium viscosity sodium carboxymethyl cellulose, 100 parts of water, 5.8 parts of sodium carbonate (monohydrate) and 2.3 parts of phloroglucinol.

The diazonium photosensitive layer may also be obtained by dipping a sheet of paper in a solution of Du Pont Naphthanil Diazo Black B, and the developing solution in container 300 may comprise 1500 parts by weight of a 5% water solution of sodium carboxymethyl cellulose, 10 parts of resorcinol and 1 part of sodium hydroxide.

It is also well known that certain ferric salts of organic acids, for example the oxalates, tartrates, and citrates, are reduced to ferrous salts when exposed to light. (L. P. Clerc, "Photography Theory and Practice," second edition, published 1937 by Pitman Publishing Company, page 402, paragraph 621 et seq.; Crowley Patents Nos. 2,093,421, 2,113,423, 2,130,070, 2,130,071, 2,137,-015.) A considerable number of photographic processes depend for their functioning on this photochemical phenomenon. It is known in connection with these iron salts that any reagent that will differentiate between ferric and ferrous salts can be used to develop the barely visible image formed by the photochemical reduction of the ferric salt into an image which is very easily visible. Examples of such developing reagents are potassium ferricyanide potassium ferrocyanide, tannins, gallic acid, B-naphthoquinone-sulphonic acid, silver salts, platinum and palladium salts. It is believed to be now apparent to one skilled in the art that the photoresponsive ferrous salts may constitute the photosensitive material of the photosensitive layer 310, and the liquid in the container 300 may include or dissolve in its travel to the photosensitive layer any one of the afore-mentioned developing reagents for distinguishing between the ferric and ferrous salts and producing the easily visible image from the very light image that is originally obtained by the photoexposure of the iron salts.

Broadly, the products of the present invention may comprise, or may be used with, any photographic, photosensitive material for the purpose of developing the same. It is to be understood that the invention is not limited to materials sensitive to visible radiation but includes photographic, photosensitive materials sensitive to such other radiation as X-ray, ultraviolet or infrared.

The term "photographic developing reagent" as used herein is intended to include any reagent which acts to render a visible image more visible, as in the case of the ferric salts, or an invisible image visible, as in the case of the silver halide emulsions. The term "development" is intended to cover the treatment of any photographic, photosensitive material for the purpose of rendering an image formed therein by photoexposure visible or more visible.

The term "exposed solarized silver halide" is to be understood to means silver halide which, subsequent to solarization, is exposed, for example, in a camera, and by "nonexposed solarized silver halide" is meant silver halide which is not exposed subsequent to solarization. Solarization may, of course, be carried out chemically or by subjecting the photosensitive layer to a predetermined uniform exposure to light.

The term "dispersion" as used herein is to be understood as covering a solution.

This is in part a continuation of copending applications Serial No. 539,550, filed June 9, 1944, for Photographic Product, and Serial No. 578,379, filed February 17, 1945, for Photographic Product (both of which have been abandoned and replaced by the present application), Serial No. 594,892, filed May 21, 1945, for Photographic Product, Process and Apparatus, Serial No. 652,612, filed March 7, 1946, for Fluid Containers, Serial No. 657,367, filed March 27, 1946, for a Photographic Film Unit Having a Frangible Fluid Container Therein (now abandoned and replaced by application Serial No. 137,393, filed January 7, 1950, Serial No. 728,983, filed February 17, 1947, for Photographic Product and Composition, and Serial No. 729,578, filed February 19, 1947, for Photographic Process and Apparatus.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic product comprising at least two layers and including a photosensitive layer, a base layer for a transfer image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said photosensitive layer comprising as a photosensitive material thereof a heavy metal salt capable of forming a latent image upon photoexposure and capable of development to produce a visible image comprising the metal of said salt, said salt being soluble in a photographic fixing solvent, said product having positioned therein photographic processing material, including a photographic developer, transportable by said liquid to said photosensitive layer, said material being capable of developing a latent image in the photosensitive layer and as a result of such development causing differential disposition throughout the photosensitive layer of a substance for providing said base layer with a transfer image.

2. A photographic product comprising at least two layers and including a photosensitive layer, a base layer for a transfer image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said photosensitive layer comprising as a photosensitive material thereof a heavy metal salt capable of forming a latent image upon photoexposure and capable of development to produce a visible image comprising the metal of said salt, said product having positioned therein photographic processing material, including a photographic developer, transportable by said liquid to said photosensitive layer, said material being contained at least in part in said liquid in said container and being capable of developing a latent image in the photosensitive layer and as a result of such development causing differential disposition throughout the photosensitive layer of a substance for providing said base layer with a transfer image.

3. A photographic product comprising at least two layers and including a photosensitive silver halide emulsion layer, a base layer for a positive image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said product having positioned therein photographic processing material, including a photographic developer, transportable by said liquid to said photosensitive layer, said material being capable of developing a latent image in said photosensitive layer, and as a result of such development causing differential disposition throughout the photosensitive layer of a substance for providing said base layer with a positive image by transfer.

4. A photographic product comprising at least two layers and including a photosensitive silver halide emulsion layer, a base layer for a positive image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said product having positioned therein photographic processing material, including a photographic developer, transportable by said liquid to said photosensitive layer, said material being contained at least in part in said liquid in said container and being capable of developing a latent image in said photosensitive layer and as a result of such development causing differential disposition throughout the photosensitive layer of a substance for providing said base layer with a positive image by transfer.

5. A photographic product comprising at least two layers and including a photosensitive silver halide emulsion layer, a base layer for a positive image, and a container holding at least a liquid solvent for a photographic developer, said photosensitive layer, said base layer and said container being attached together to permit at least a portion of said base layer and said photosensitive layer to be superposed with said contianer so positioned as to be capable of being ruptured and without removal of its ruptured portion of releasing its liquid content between two layers of said product to at least partially permeate the superposed base layer and photosensitive layer, said product having positioned therein photographic processing material transportable by said liquid to said photosensitive layer, said material being contained at least in part in said liquid and comprising a developer for the silver halide emulsion and a substance for forming a soluble silver complex with silver halide, said material when transported to said photoesensitive layer being capable of developing a latent image therein and of causing the formation of a soluble silver complex for providing said base layer with an image by transfer.

6. A photographic product comprising at least two layers and including a photosensitive silver halide emulsion layer, a base layer for a positive image, and a container holding a liquid solution of a silver halide developer and a silver halide solvent, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said liquid solution when transported to said photosensitive layer being capable of developing a latent image in said photosensitive layer and of causing the formation of a soluble silver complex for providing said base layer with an image by transfer.

7. A photographic product comprising at least two layers and including a photosensitive silver halide emulsion layer, a base layer for a positive image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said product having positioned therein photographic processing material transportable by said liquid to said photosensitive layer, said material comprising hydroquinone and sodium thiosulfate and acting when transported to said photosensitive layer to develop a latent image therein and to form a soluble silver complex with the undeveloped silver halide, said complex being capable of providing said base layer with a positive image, by transfer, of the subject matter of said latent image.

8. A photographic product comprising at least two layers and including a photosensitive layer, a base layer for a transfer image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said photosensitive layer comprising as a photosensitive material thereof a heavy metal salt capable of forming a latent image upon photoexposure and capable of development to produce a visible image comprising the metal of said salt, said salt being soluble in a photographic fixing solvent, said product having positioned therein photographic processing material, including a photographic developer, transportable by said liquid to said photosensitive layer, said material being positioned at least in part in solid form outside said container in position to be dissolved by said liquid upon release of the latter, said material being capable of developing a latent image in said photosensitive layer and as a result of such development causing differential disposition throughout the photosensitive layer of a substance for providing said base layer with a transfer image.

9. A photographic product comprising at least two layers and including a photosensitive silver halide emulsion layer, a base layer for a positive image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said product having positioned therein photographic processing material transportable by said liquid to said photosensitive layer, said material being positioned at least in part in solid form outside said container and positioned to be dissolved by said liquid upon release of the latter, said material comprising a developer for the silver halide emulsion and a substance for forming a soluble silver complex with silver halide and when transported to said photosensitive layer being capable of developing a latent image therein and of causing the formation of a soluble silver complex for providing said base layer with an image by transfer.

10. A photographic product comprising at least two layers and including a photosensitive layer, a base layer for a transfer image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said photosensitive layer comprising as a photosensitive material thereof a heavy metal salt capable of forming a latent image upon photoexposure and capable of development to produce a visible image comprising the metal of said salt, said salt being soluble in a photographic fixing solvent, said product having positioned therein photographic processing material transportable by said liquid to said photosensitive layer, said material comprising a developer and a substance capable of reacting with the products of the development of said photosensitive layer to form a dye, said material when transported to said photosensitive layer being capable of developing a latent image therein and of providing said base layer, by transfer, with a dye image of the subject matter of said latent image.

11. A photographic product comprising at least two layers and including a photosensitive silver halide emulsion layer, a base layer for a transfer image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said product having positioned therein photographic processing material transportable by said liquid to said photosensitive layer, said material comprising a developer and a substance capable of reacting with the products of the development of said photosensitive layer to form a dye, said material when transported to said photosensitive layer being capable of developing a latent image therein and of providing said base layer, by transfer, with a dye image.

12. A photographic product comprising at least two layers and including a photosensitive solarized silver halide emulsion layer, a base layer for a transfer image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said product having positioned therein photographic processing material transportable by said liquid to said photosensitive layer, said material comprising a developer and a substance capable of reacting with the products of the development of said photosensitive layer to form a dye, said material being capable of developing a latent image in said photosensitive layer and of providing said base layer, by transfer, with a dye image.

13. A photographic product comprising at least two layers and including a photosensitive layer, a base layer for a positive image, and a container holding at least a liquid solvent for a photographic developer, said photosensitive layer, said base layer and said container being attached together to permit at least a portion of said base layer and said photosensitive layer to be superposed with said container so positioned as to be capable of being ruptured and without removal of its ruptured portion of releasing its liquid content between two layers of said product to at least partially permeate the superposed base layer and photosensitive layer, said photosensitive layer comprising as a photosensitive material thereof a heavy metal salt capable of forming a latent image upon photoexposure and capable of development to produce a visible image comprising the metal of said salt, said salt being soluble in a photographic fixing solvent, said product having positioned therein photographic processing material, including a photographic developer, transportable by said liquid to said photosensitive layer, said material being capable of developing a latent image in said photosensitive layer and as a result of such development causing differential disposition throughout the photosensitive layer of a substance for providing said base layer with a positive image by transfer, said base layer and said photosensitive layer being so attached together in said product as to be readily strippable after the formation of said positive image.

14. A photographic product comprising a sheetlike lamination including a photosensitive silver halide emulsion layer, a base layer for a transfer image, and a container holding at least a liquid solvent for a photographic developer, said layers and said container being attached together in superposed relation, portions of said container being located between the outer strata of said sheetlike lamination and being separable upon application of mechanical stress to said lamination, the contents of said container being releasable through said separated portions between said outer strata of said sheetlike lamination to a predetermined portion of said superposed layers, said product having positioned therein photographic processing material, including a photographic developer, transportable by said liquid to said photosensitive layer, said material being capable of developing a latent image in said photosensitive layer and as a result of such development causing differential disposition throughout he photosensitive layer of a substance for providing said base layer with a transfer image.

15. A photographic product comprising a sheetlike lamination including a photosensitive silver halide emulsion layer, a base layer for a positive image, and a container holding at least a liquid solvent for a photographic developer, said layers and said container being attached together in superposed relation, portions of said container being located between the outer strata of said sheetlike lamination and being separable upon application of mechanical stress to said lamination, the contents of said container being releasable through said separated portions between said outer strata of said sheetlike lamination to a predetermined portion of said superposed layers, said product having positioned therein photographic processing material, including a photographic developer, transportable by said liquid to said photosensitive layer, said material being contained at least in part in said liquid in said container and being capable of developing a latent image in said photosensitive layer and as a result of such development causing differential disposition throughout the photosensitive layer of a substance for providing said base layer with a positive image by transfer.

16. A photographic product comprising a sheetlike lamination including a photosensitive silver halide emulsion layer, a base layer for a positive image, and a container holding at least a liquid solvent for a photographic developer, said layers and said container being attached together in superposed relation, portions of said container being located between the outer strata of said sheetlike lamination and being separable upon application of mechanical stress to said lamination, the contents of said container being releasable through said separated portions between said outer strata of said sheetlike lamination to a predetermined portion of said superposed layers, said product having positioned therein photographic processing material transportable by said liquid to said photosensitive layer, said material comprising a developer for the silver halide emulsion and a substance for forming a soluble silver complex with silver halide.

17. A photographic product comprising, in combination, a solarized silver halide emulsion layer, a base layer for a positive image, and a container holding at least a liquid solvent for a photographic developer, said container and said layers being attached together, said container being located to release the contents thereof upon application of suitable mechanical stress thereto to superposed portions of said layers, said product having positioned therewithin photographic processing material transportable at least in part by said liquid to said superposed portions, said material being capable of developing a latent image in said emulsion layer and of providing said base layer with a dye image by transfer, said material comprising a developer and a substance adapted to react with the oxidation product of said developer to form a dye.

18. A photographic product comprising, in combination, a solarized silver halide emulsion layer, a base layer for a positive image, and a container holding at least a liquid solvent for a photographic developer, said container and said layers being attached together, said container being located to release the contents thereof upon application of suitable mechanical stress thereto to superposed portions of said layers, said product having positioned therewithin photographic processing material transportable at least in part by said liquid to said superposed portions, said material being capable of developing a latent image in said emulsion layer and of providing said base layer, by transfer, with a dye image of said latent image, said material comprising a developer whose oxidation product couples with itself to form a dye.

19. A photographic product comprising, in combination, a solarized silver halide emulsion layer, a base layer for a positive image, and a container holding at least a liquid solvent for a photographic developer, said container and said layers being attached together, said container being located to release the contents thereof upon application of suitable mechanical stress thereto to superposed portions of said layers, said product having positioned therewithin photographic processing material transportable at least in part by said liquid to said superposed portions, said material being capable of developing a latent image in said emulsion layer and of providing said base layer with a positive dye image of the subject matter of said latent image, said material comprising a developer and a substance adapted to react with the oxidation product of said developer to form a dye, said developer being contained in said liquid in said container.

20. A photographic product comprising a photosensitive material which includes a supporting layer and a silver halide emulsion layer mounted on said supporting layer, a base layer for receiving, by transfer, a positive image, and a rupturable container holding at least a liquid solvent for a photographic developer, said container and said layers being attached together so that said container is capable upon rupture of releasing at least part of its contents to permeate superposed portions of said photosensitive layer and said base layer, said product containing therewithin material including a photographic developer adapted to be transported by the released liquid to said superposed portions, said last-named material being capable of developing a latent image in said silver halide emulsion layer and of causing as a result of such development the differential disposition throughout the emulsion layer of a substance for providing said base layer with a transfer image.

21. A photographic product comprising a photosensitive material which includes a supporting layer and a silver halide emulsion layer mounted on said supporting layer, a base layer for receiving, by transfer, a positive image, and a rupturable container holding a solution of a developer and a silver halide solvent, said container and said layers being attached together so that said container is capable upon rupture of releasing at least part of its contents to permeate superposed portions of said photosensitive layer and said base layer, said solution being capable of developing a latent image in said silver halide emulsion layer and of causing as a result of such development the differential disposition throughout the emulsion layer of a substance capable of providing said base layer with a transfer image.

22. A photographic product comprising a photosensitive silver halide emulsion layer, a base layer for a positive image, and containing means holding at least a liquid solvent for a photographic developer, said photosensitive layer, said base layer and said containing means being attached together so that said photosensitive layer and said base layer may be superposed and so that one liquid-containing portion of said containing means may be located adjacent one area of said photosensitive layer and another liquid-containing portion of said containing means may be located adjacent another area of said photosensitive layer laterally spaced with respect to said first area, each of said liquid-containing portions being capable upon rupture of releasing the liquid content thereof to at least partially permeate the area of the photosensitive layer adjacent thereto, the liquid-containing portions being individually rupturable so that a segment along the length of the composite film structure may be processed without processing an adjacent segment, said product having positioned therein photographic processing material, including a photographic developer, transportable by the liquid of each of said liquid-containing portions to its said adjacent area of said photosensitive layer, said material being capable of developing a latent image in said area of said photosensitive layer and of providing the portion of said base layer superposed with respect to said area with a transfer image.

23. A photographic product comprising a photosensitive silver halide emulsion layer, a base layer for a positive image, and containing means holding at least a liquid solvent for a photographic developer, said photosensitive layer, said base layer and said containing means being attached together so that said photosensitive layer and said base layer may be superposed and so that one liquid-containing portion of said containing means may be located adjacent one area of said photosensitive layer and another liquid-containing portion of said containing means may be located adjacent another area of said photosensitive layer laterally spaced with respect to said first area, each of said liquid-containing portions being capable upon rupture of releasing the liquid content thereof to at least partially permeate the area of the photosensitive layer adjacent thereto, the liquid-containing portions being individually rupturable so that a segment along the length of the composite film structure may be processed without processing an adjacent segment, said product having positioned therein photographic processing material transportable by the liquid of each of said liquid-containing portions to its said adjacent area of said photosensitive layer, said material being contained at least in part in said liquid-containing means and comprising a developing agent and a substance capable of forming a soluble complex with silver halide, said material when transported to said photosensitive layer being capable of developing a latent image therein and of causing the formation of a soluble silver complex for providing said base layer with a positive image by transfer.

24. A photographic product comprising a photosensitive silver halide layer, a water-absorptive, strippable base layer, and a rupturable container holding at least a liquid solvent for a photographic developer, said product having positioned therewithin a photographic developer for silver halide soluble in said solvent and rendered effective upon release of said liquid after rupture of the container to develop said photosensitive layer, said layers and said container being attached together so as to permit said layers to be superposed to form at least a part of a multilayer unit wherein said liquid is held by said container so as not to wet the photosensitive and base layers and wherein said container is positioned for releasing its liquid content between the outer surfaces of said unit.

25. A photographic product comprising a photosensitive silver halide layer, a base layer, and a rupturable container holding a liquid solution of a silver halide developer, said layers and said container being attached together so as to permit said layers to be superposed with said liquid held by said container so as not to wet said layers and with said container positioned for releasing said liquid between said layers.

26. A photographic product comprising a photosensitive layer having as a photosensitive material thereof a heavy metal salt capable of forming a latent image upon photoexposure and capable of development to produce a visible image comprising the metal of said salt, said salt being soluble in a photographic fixing solvent, a water-absorptive, strippable base layer, and a rupturable container holding a liquid solvent for a photographic developer, said product having positioned therewithin a photographic developer for said salt soluble in said solvent and rendered effective upon release of said liquid after rupture of the container to develop said photosensitive layer, said layers and said container being attached together so as to permit said layers to be superposed to form at least a part of a multilayer unit wherein said liquid is held by said container so as not to wet the photosensitive and base layers and wherein said container is positioned for releasing its liquid content between the outer surfaces of said unit.

27. A photographic product comprising a liquid-confining layer including at least a photosensitive silver halide portion, another liquid-confining layer, and a rupturable container holding a liquid, said layers and said container being attached together so as to permit said layers to be superposed with said liquid held by said container so as not to wet said layers and with said container positioned for releasing said liquid between said layers, said product containing a soluble silver halide developer, said developer being in an amount sufficient to develop an image in said photosensitive silver halide portion and being rendered effective to develop said photosensitive silver halide portions upon release of said liquid.

28. A photographic product comprising a liquid-confining layer including at least a photosensitive portion, said photosensitive portion comprising as a photosensitive material thereof a heavy metal salt capable of forming a latent image upon photoexposure and capable of development to produce a visible image comprising the metal of said salt, said salt being soluble in a photographic fixing solvent, another liquid-confining layer, and a rupturable container holding a liquid, said layers and said container being attached together so as to permit said layers to be superposed with said liquid held by said container so as not to wet said layers and with said container positioned for releasing said liquid between said layers, said product containing a developer, said developer being in an amount sufficient to develop an image in said photosensitive portion and being rendered effective to permeate said photosensitive silver halide portion upon release of said liquid.

29. The product of claim 1 in which the container is sheetlike and in its liquid-releasing position is superposed with respect to said photosensitive layer for releasing its liquid depthwise thereof in the direction of said photosensitive layer.

30. The product of claim 1 in which the container is elongated and rupturable and in liquid-releasing position is located so that its liquid is spreadable between portions of said layers to one side of the container.

31. The product of claim 1 in which the container is sac-like and has a rupturable seal adjacent one edge thereof and in which the container, in liquid-releasing position, is located to one side of and with said seal adjacent to the portions of the layers between which the liquid is to be released.

32. The product of claim 6 in which the container is sheetlike and in its liquid-releasing position is superposed with respect to said photosensitive layer for releasing its liquid depthwise to permeate an area of said photosensitive layer coextensive therewith.

33. The product of claim 6 in which the container is elongated and rupturable and in liquid-releasing position is located so that its liquid content is spreadable between portions of said layers to one side of the container.

34. The product of claim 6 in which the container is sac-like and has a rupturable seal adjacent one edge thereof and in which the container, in liquid-releasing position, is located to one side of and with said seal adjacent to the portions of the layers between which the liquid is to be released and the liquid contains a film-forming plastic in solution to increase its viscosity and facilitate the uniform spreading thereof.

35. The product of claim 25 in which said container is sheetlike and in liquid-releasing position is superposed on the photosensitive layer for releasing the liquid depthwise thereof in the direction of said photosensitive layer.

36. The product of claim 25 in which the container is elongated and rupturable and in liquid-releasing position is so located as to release its liquid to one side of the container for spreading between portions of said layers.

37. The product of claim 25 in which the container is sac-like, elongated and collapsible and is provided with a rupturable seal adjacent one long edge thereof and in which the container, in liquid-releasing position, is so located as to release its liquid between portions of said layers spaced to one side of the container.

38. The product of claim 37 in which the liquid in the container includes a thickening agent for appreciably increasing its viscosity to facilitate the spreading of the liquid between said layers.

39. The product of claim 38 in which the thickening agent is a plastic and forms a solid plastic film between said layers when spread.

40. The product of claim 25 in which the container is sac-like and the liquid in said container has a silver halide solvent, an alkali and a film-forming plastic dissolved therein.

41. A photographic product containing material, including a photographic reagent, for producing a transformation of an image in said product, said reagent being present in an amount sufficient to effect said transformation, said product comprising a liquid-confining layer including at least a photosensitive portion capable of having an image formed therein upon photoexposure, another liquid-confining layer, and a rupturable containing means holding a liquid, said photosensitive portion having as its photosensitive material a salt from the class consisting of (a) the photosensitive ferric salts, (b) the photosensitive diazonium salts, and (c) heavy metal salts capable of forming a latent image upon photoexposure and capable of development to produce a visible image comprising the metal of said salt, said liquid being present in an amount sufficient for transforming said image in said photosensitive portion, said liquid, upon permeation of said photosensitive portion, rendering said transforming material effective to transform said image, said layers and said containing means being attached together to permit said layers to be superposed with said liquid held by said containing means so as to not wet said layers and with said containing means being positioned for releasing said liquid between said layers.

42. The product of claim 41 in which the containing means is a sheet container which in liquid-releasing position is placed coextensively over the exposed photosensitive portion, releasing its liquid depthwise to permeate said exposed photosensitive portion.

43. The product of claim 42, the sheet container of which is separated into a plurality of liquid-confining cells and in which said other liquid-confining layer is integral with a wall of said sheet container.

44. The product of claim 41 in which the liquid-confining layers are attached together adjacent their ends with a hinge.

45. The product of claim 41 in which each of said layers is opaque so that when said layers are superposed they provide a barrier which prevents visible light actinic to said photosensitive portion from reaching said photosensitive portion.

46. The product of claim 41 in which the reagent is a developer for said photosensitive portion.

47. The product of claim 41 in which the photosensitive portion is a silver halide emulsion and the transforming material includes a silver halide developer, said material being capable of providing said other liquid-confining layer with a transfer image.

48. The product of claim 41 in which the photosensitive portion is a silver halide emulsion and the transforming material includes a silver halide developer, said material being capable of providing said other liquid-confining layer with a dye transfer image.

49. The product of claim 41 in which the photosensitive portion is a silver halide emulsion and the transforming material includes a silver halide developer, said material being capable of providing said other liquid-confining layer with a transfer image comprising silver.

50. A photographic product containing material, including a photographic reagent, for producing a transformation of an image in said product, said reagent being present in an amount sufficient to effect said transformation, said product comprising a liquid-confining layer including at least a photographic, photosensitive portion capable of having an image formed therein upon photoexposure, another liquid-confining layer, and a rupturable container holding a liquid, said liquid being in an amount sufficient for transforming said image in said photosensitive portion, said liquid, upon permeation of said photosensitive portion, rendering said transforming material effective to transform said image, said photosensitive portion having as its photosensitive material a salt from the class consisting of (a) the photosensitive ferric salts, (b) the photosensitive diazonium salts, and (c) heavy metal salts capable of forming a latent image upon photoexposure and capable of development to produce a visible image comprising the metal of said salt, said layers and said container being attached together so as to permit said layers to be superposed with said liquid held by said container so as not to wet said layers and with said container positioned for releasing said liquid between said layers, said container being a pod and having a rupturable seal adjacent one edge thereof and, in liquid-releasing position, being laterally disposed to one side of the portions of the layers between which the liquid thereof is to be released with said seal interposed between the layers.

51. The product of claim 50 in which the liquid includes a thickening agent in sufficient quantity to facilitate the uniform spreading of the liquid between the layers and the reagent is a developer.

52. The product of claim 51 in which the thickening agent is a plastic so that a film of said plastic is the residue of said liquid when the later is spread and permitted to dry.

53. The product of claim 52 in which the developer is contained in the liquid in the container.

54. The product of claim 50 in which the photosensitive portion is a silver halide emulsion, the other liquid-confining layer is paper, and the liquid in the container includes a developing agent for silver halide and sodium carboxymethyl cellulose.

55. The product of claim 54 in which the liquid in the container also includes a silver halide solvent and an alkali.

56. The product of claim 50 in which the container walls are deformable and are impervious to oxygen and to the vapor of said liquid.

57. A photographic product containing material, including a photographic reagent, for producing a transformation of an image in said product, said reagent being present in an amount sufficient to effect said transformation, said product comprising a photographic photosensitive element including at least a photosensitive portion capable of having an image formed therein upon photoexposure and another element containing a liquid, said photosensitive portion having as its photosensitive material a salt from the class consisting of (a) the photosensitive ferric salts, (b) the photosensitive diazonium salts, and (c) heavy metal salts capable of forming a latent image upon photoexposure and capable of development to produce a visible image comprising the metal of said salt, said liquid-containing element being attached to and so superposed on said photosensitive element as to be capable of releasing its liquid depthwise to permeate said photosensitive portion of the photosensitive element, said liquid-containing element comprising at least three strata including a liquid-containing stratum and a pair of liquid-confining strata formed of material impervious to said liquid and superposed on opposite sides of said liquid-containing stratum to confine the liquid in the latter, one of said liquid-confining strata being interposed between said liquid-containing stratum and said photosensitive element and being more rupturable than the remainder of said strata and when ruptured permitting the liquid of the liquid-containing stratum to be released to permeate said photosensitive element, the liquid in the liquid-containing stratum being in an amount sufficient for transforming said image in said photosensitive element and, upon permeation of said photosensitive element, rendering said transforming material effective to transform said image in said photosensitive portion.

58. The product of claim 57 in which the photosensitive portion has as its photosensitive material a heavy metal salt capable of forming a latent image upon photoexposure and capable of development to produce a visible image comprising the metal of said salt, said salt being soluble in a photographic fixing solvent.

59. The product of claim 57 in which the photosensitive portion is a silver halide emulsion.

60. The product of claim 57 in which the photographic reagent is contained in the liquid in the liquid-containing stratum.

61. The product of claim 57 in which said liquid-containing stratum is a porous sheet and contains a liquid in the pores thereof.

62. The product of claim 57 in which said liquid-containing stratum comprises a plurality of recesses for receiving the liquid, each recess being closed on one side by the more rupturable liquid-confining stratum and being separated from every other recess by a liquid-impermeable cell wall.

63. The product of claim 57 which comprises a distributing layer in addition to said other strata, said distributing layer being permeable to the liquid in the liquid-containing element and interposed between the more rupturable liquid-confining stratum of the latter element and the photosensitive element, said layer acting as a distributing layer to uniformly distribute the liquid passing to the photosensitive element upon the rupture of said more rupturable stratum.

64. The product of claim 63 in which at least part of the photographic reagent is contained in solid form in said permeable layer for dissolution by the liquid in its travel to the photosensitive portion.

65. The product of claim 57 in which the photosensitive portion is a solarized silver halide emulsion.

66. A photographic product comprising a rupturable container holding a liquid, said liquid having dispersed therein a thickening agent, and a sheet support upon one portion of which said container is mounted, another portion of said sheet support providing a spreading surface having a liquid-receiving area adjacent said container onto which said liquid is spreadable directly from said container, said liquid-receiving area being one of the outer surfaces of said product so that liquid spread thereon is capable of contacting a photosensitive element superposed on said product, the liquid in the container being sufficient in amount to cover said liquid-receiving area and to provide thereon a continuous film of said liquid, said product containing a reducing agent for developing the exposed portion of a photographic element having as its photosensitive material a heavy metal salt capable of forming a latent image upon photoexposure and capable of being developed by said reducing agent to produce a visible image comprising the metal of said salt, said reducing agent being in an amount sufficient to develop an image in an area of said photosensitive element equivalent to said liquid-receiving area, the container contents, when spread on said liquid-receiving area, placing said reducing agent in condition to effect the development.

67. The product of claim 66 in which said reducing agent is contained in the liquid in the container.

68. The product of claim 66 in which the thickening agent is an organic film-forming colloid dissolved in the liquid so that a film of said colloid is the residue of said liquid when the latter is spread and permitted to dry.

69. The product of claim 68 in which the liquid includes water and in which the film-forming colloid is a plastic.

70. The product of claim 66 in which the thickening agent is present in sufficient quantity to give said liquid a viscosity in excess of one thousand centipoises at 24° C.

71. The product of claim 66 in which the reducing agent is dissolved in the liquid in the container and is a silver halide developer.

72. A photographic product comprising a rupturable container holding a liquid, said liquid having dispersed therein a thickening agent, and a sheet support upon one portion of which said container is mounted, another portion of said sheet support providing a spreading surface having a liquid-receiving area adjacent said container onto which said liquid is spreadable directly from said container, said liquid-receiving area being one of the outer surfaces of said product so that liquid spread thereon is capable of contacting a photosensitive element superposed on said product, the liquid in the container being sufficient in amount to cover said liquid-receiving area and to provide thereon a continuous film of said liquid, said product containing at least one photographic processing agent from the class consisting of the silver halide developers and the silver halide fixers, said processing agent being in an amount sufficient to process an image in an area of a photosensitive, silver halide element equivalent to said liquid-receiving area, the container contents, when spread on said liquid-receiving area, placing said processing agent in condition to effect the processing of said element.

73. The product of claim 66 in which the photographic processing agent is dissolved in the liquid in the container and is a silver halide fixer.

74. A photographic product comprising a rupturable container holding a liquid, said liquid having dispersed therein a thickening agent, a silver halide developer and a silver halide solvent and having a viscosity in excess of 1,000 centipoises at 24° C., and a sheet support upon one portion of which said container is mounted, another portion of said sheet support providing a spreading surface having a liquid-receiving area adjacent said container onto which said liquid is spreadable directly from said container, said liquid-receiving area being greater than the area covered by said container and being one of the outer surfaces of said product so that liquid spread thereon is capable of contacting a photosensitive element superposed on said product, the liquid in the container being sufficient in amount to cover said liquid-receiving area and provide thereon a continuous film of said liquid, the container contents, when spread on said liquid-receiving area, placing the reagents therein in condition to form a transfer print of a latent image in an area of a photographic silver halide emulsion equivalent to said liquid-receiving area.

75. A photographic product comprising a plurality of rupturable containers, each container holding a liquid having dispersed therein a thickening agent, and a sheet support upon which said containers are mounted, said containers being spaced lengthwise of said support, the side of said sheet support, upon which said containers are mounted, having a plurality of liquid-receiving areas, one of said areas being adjacent each of said containers, the liquid in each container being sufficient in amount to cover the liquid-receiving area adjacent thereto and to provide thereon a continuous film of said liquid, said product containing a reducing agent for developing the exposed portion of a photosensitive element having as its photosensitive material a heavy metal salt capable of forming a latent image upon photoexposure and capable of being developed by said reducing agent to produce a visible image comprising the metal of said salt, each container and the portion of said sheet support within the receiving area associated therewith containing said reagent in an amount sufficient to transform an image in an area of a photosensitive, photographic element equivalent to said liquid-receiving area, the container contents, when spread on said liquid-receiving area, placing said reducing agent in condition to effect the development.

76. The product of claim 75 in which the containers are elongated and have their long axes substantially parallel to one another and extending transversely of the sheet support.

77. The product of claim 75 which contains a silver halide developer as the reducing agent and also material capable of cooperating with said developer to provide the sheet support with a transfer image when the contents of each container are spread between said support and a silver halide element.

78. A photographic product comprising a plurality of rupturable containers, each container holding a liquid having dispersed therein a thickening agent, and a sheet support upon which said containers are mounted, said containers being spaced lengthwise of said support, the side of said sheet support, upon which said containers are mounted, having a plurality of liquid-receiving areas, one of said areas being adjacent each of said containers, the liquid in each container being sufficient in amount to cover the liquid-receiving area adjacent thereto and to provide thereon a continuous film of said liquid, said product containing at least one photographic processing agent from the class consisting of the silver halide developers and the silver halide fixers, each container and the portion of said sheet support within the liquid-receiving area associated therewith containing said processing agent in an amount sufficient to process an image in an area of a photosensitive, silver halide element equivalent to said liquid-receiving area, the container contents, when spread on said liquid-receiving area, placing said processing agent in a condition to effect the processing of said element.

79. A photographic product comprising a rupturable container holding a liquid, said liquid having dispersed therein a thickening agent, and a sheet support upon which said container is mounted, said sheet support providing a spreading surface having a liquid-receiving area adjacent said container onto which said liquid is spreadable directly from said container, the liquid in the container being sufficient in amount to cover said liquid-receiving area and to provide thereon a continuous film of said liquid, said sheet support comprising a photographically photosensitive layer which is at least in part coextensive with said liquid-receiving area, said photosensitive layer having as its photosensitive material a salt from the class consisting of (a) the photosensitive ferric salts, (b) the photosensitive diazonium salts, and (c) heavy metal salts capable of forming a latent image upon photoexposure and capable of development to produce a visible image comprising the metal of said salt, said product containing an image-transforming reagent in an amount sufficient to transform an image in the portion of the photosensitive layer within said liquid-receiving area, the container contents when spread on said liquid-receiving area placing said reagent in condition to effect the image transformation.

80. The product of claim 79 in which the image-transforming reagent is a developer for said photosensitive layer.

81. The product of claim 79 in which the photosensitive layer is a silver halide emulsion.

82. The product of claim 79 in which the photosensitive layer is a silver halide emulsion and the image-transforming reagent is a processing agent from the class consisting of the silver halide developers and the silver halide fixers.

83. A photographic product comprising a rupturable container holding a liquid, said liquid having dispersed therein a thickening agent, and a sheet support upon which said container is mounted, said sheet support providing a spreading surface having a liquid-receiving area adjacent said container onto which said liquid is spreadable directly from said container, said liquid-receiving area being greater than the area covered by said container, the liquid in the container being sufficient in amount to cover said liquid-receiving area and to provide thereon a continuous film of said liquid, said sheet support comprising a silver halide emulsion layer which is at least in part coextensive with said liquid-receiving area, said product containing a silver halide developer in an amount sufficient to develop a latent image in the portion of the silver halide emulsion layer within said liquid-receiving area, the container contents, when spread on said liquid-receiving area, placing said developer in condition to develop a latent image in said emulsion layer.

84. A product containing a reducing agent for developing the exposed portion of a photosensitive element having as its photosensitive material a heavy metal salt capable of forming a latent image upon photoexposure and capable of being developed by said reducing agent to produce a visible image comprising the metal of said salt, said product comprising a sheet support and an elongated container holding a liquid dispersion of a film-forming colloid, said container being mounted on said sheet support, longitudinally extending portions of said container being uniformly more rupturable than other portions of the container and providing upon rupture a liquid-dispensing passage extending along a substantial length of the container, the container walls being at least in part deformable and flexible for transmitting to the container contents externally applied pressure of sufficient magnitude to rupture said more rupturable portions, said sheet support providing a spreading surface extending substantially perpendicularly from the long dimension of said container and at least as wide as the length of said rupturable liquid-dispensing portion of the container onto which surface said container contents are spreadable from said liquid-dispensing portion, said liquid dispersion being sufficient in amount to be spread on an area of said surface substantially greater than the container area and to provide said first-named area with a film of said colloid, the spreading of the container contents placing said reducing agent in condition for developing a corresponding area of one said photosensitive element.

85. The product of claim 84 wherein the dispersion of the colloid in the container is a solution and the reducing agent is in the container.

86. A product containing at least one photographic processing agent from the class consisting of the silver halide developers and the silver halide fixers, said product comprising a sheet support and an elongated container holding a liquid dispersion of a film-forming colloid, said container being mounted on said sheet support, longitudinally extending portions of said container being uniformly more rupturable than other portions of the container and providing upon rupture a liquid-dispensing passage extending along a substantial length of the container, the container walls being at least in part deformable and flexible for transmitting to the container contents externally applied pressure of sufficient magnitude to rupture said more rupturable portions, said sheet support providing a spreading surface extending substantially perpendicularly from the long dimension of said container and at least as wide as the length of said rupturable liquid-dispensing portion of the container onto which surface said container contents are spreadable from said liquid-dispensing portion, said liquid dispersion being sufficient in amount to be spread on an area of said surface substantially greater than the container area and to provide said first-named area with a film of said colloid, the spreading of the container contents placing said processing agent in condition for processing a corresponding area of a photosensitive, silver halide element.

87. A product containing a silver halide developer and capable of developing a photosensitive silver halide element, said product comprising an elongated rupturable container holding an aqueous dispersion of an organic film-forming colloid, and a sheet support upon which said container is mounted, portions of the container walls being secured together in face-to-face relation to provide a liquid-dispensing lip extending substantially the length of the container, the material of the container walls being stronger than the seal of the dispensing lip and said walls being at least in part deformable and flexible for transmitting to the container contents externally applied pressure of sufficient magnitude to open said lip, said sheet support providing a spreading surface extending substantially perpendicularly from the dispensing lip and at least as wide as the length of said lip onto which said container contents are spreadable from said dispensing lip, said aqueous dispersion being sufficient in amount to be spread over an area of said surface substantially greater than the container area and to provide said area with a solid film of said organic colloid, the silver halide developer in said product being rendered effective in said area upon the spreading of said dispersion.

88. A product containing a silver halide developer and capable of developing a photosensitive silver halide element, said product comprising a flat, multi-sided container holding an aqueous dispersion of an organic film-forming colloid, and a sheet support upon which said container is mounted, portions of the container walls being secured together in face-to-face relation to provide a liquid-dispensing lip extending substantially the length of one of said sides of the container, the material of the container walls being stronger than the seal of the dispensing lip and said walls being at least in part deformable and flexible for transmitting to the container contents externally applied pressure of sufficient magnitude to open said lip, said sheet support providing a spreading surface extending substantially perpendicularly from the dispensing lip and at least as wide as the length of said lip onto which said container contents are spreadable from said dispensing lip, said aqueous dispersion being sufficient in amount to be spread over an area of said surface substantially greater than the container area and to provide said area with a solid film of said organic colloid, the silver halide developer in said product being rendered effective in said area upon the spreading of said dispersion.

89. A product containing a silver halide developer and capable of developing a photosensitive silver halide element, said product comprising a flat, multi-sided rupturable container holding a liquid dispersion of a film-forming colloid, and a sheet support upon which said container is mounted, portions of the container walls being secured together in face-to-face relation to provide a liquid-dispensing lip extending substantially the length of one of said sides of the container, the material of the container walls being stronger than the seal of the dispensing lip and said walls being at least in part deformable and flexible for transmitting to the container contents externally applied pressure of sufficient magnitude to open said lip, said sheet support providing a spreading surface extending substantially perpendicularly from the dispensing lip and at least as wide as the length of said lip onto which said container contents are spreadable from said dispensing lip, said liquid dispersion being sufficient in amount to be spread over an area of said surface substantially greater than the container area and to provide said area with a solid film of said organic colloid, the silver halide developer in said product being rendered effective in said area upon the spreading of said dispersion.

90. A product containing a reducing agent for developing the exposed portion of a photosensitive element having as its photosensitive material a heavy metal salt capable of forming a latent image upon photoexposure and capable of being developed by said reducing agent to produce a visible image comprising the metal of said salt, said product comprising an elongated rupturable container holding a liquid dispersion of a film-forming colloid, and a sheet support upon which said container is mounted, portions of the container walls being secured together in face-to-face relation to provide a liquid-dispensing lip extending substantially the length of the container, the material of the container walls being stronger than the seal of the dispensing lip and said walls being at least in part deformable and flexible for transmitting to the container contents externally applied pressure of sufficient magnitude to open said lip, said sheet support providing a spreading surface extending substantially perpendicularly from the dispensing lip and at least as wide as the length of said lip onto which said container contents are spreadable from said dispensing lip, said liquid dispersion being sufficient in amount to be spread over an area of said surface substantially greater than the container area and to provide said first-named area with a solid film of said colloid, the spreading of the container contents placing said reducing agent in condition for developing a corresponding area of one said photosensitive element.

91. The product of claim 88 which comprises a photosensitive silver halide layer, at least a portion of said photosensitive layer being coextensive with the liquid-receiving area of the spreading surface, the spreading of the container contents rendering the developer effective to develop at least said portion of the photosensitive silver halide layer.

92. The product of claim 87 in which said dispersion of an organic film-forming colloid is a solution of a plastic.

93. The product of claim 92 in which the plastic is sodium carboxymethyl cellulose.

94. The product of claim 87 in which the organic colloid is a plastic and the silver halide developer is in the container.

95. The product of claim 94 in which the container also contains a silver halide solvent.

96. The product of claim 95 in which the sheet support is baryta paper.

97. The product of claim 87 in which the container is flat and substantially rectangular in shape and the sheet support is not appreciably wider than the container is long, the container being mounted with its long axis extending widthwise of the support.

98. The product of claim 97 wherein all of the container walls are formed from a single sheet of deformable and flexible multi-ply sheet material.

99. A photographic product capable of dispensing a photographic reagent directly to a photosensitive silver halide element for developing the same, said product comprising a rupturable disposable container holding a sufficient quantity of processing liquid for a single application, which liquid includes a reducing agent for developing the exposed portion of a photosensitive element having as its photosensitive material a heavy metal salt capable of forming a latent image upon photoexposure and capable of being developed by said reducing agent to produce a visible image comprising the metal of said salt, said container being multi-sided and elongated and having the walls thereof formed of a deformable sheet material, said walls being secured together in face-to-face relation along a long edge of the container to provide a liquid dispensing lip at said edge extending substantially the length of the container, said sheet material being stronger than the seal of the dispensing lip and being sufficiently deformable and flexible to transmit to the container contents externally applied pressure of sufficient magnitude to open said lip.

100. A photographic product capable of dispensing a photographic reagent directly to an exposed photosensitive, silver halide element for processing the same, said product comprising a rupturable disposable container holding a sufficient quantity of processing liquid for a single application, which liquid includes a least one processing agent from the class consisting of the silver halide developers and the silver halide fixers, said container being multi-sided and elongated and having the walls thereof formed of a deformable sheet material, said walls being secured together in face-to-face relation along a long edge of the container to provide a liquid-dispensing lip at said edge extending substantially the length of the container, said sheet material being stronger than the seal of the dispensing lip and being sufficiently deformable and flexible to transmit to the container contents externally applied pressure of sufficient magnitude to open said lip.

101. A photographic product capable of dispensing a processing agent between a photosensitive silver halide element and a print-receiving layer to form transfer prints, said product comprising a rupturable, disposable, elongated container holding a liquid dispersion which includes a silver halide developer and a silver halide solvent, longitudinally extending portions of said container being uniformly more rupturable than other portions of the container and providing, upon rupture, a liquid dispensing passage along a substantial length of the container, the container walls being at least in part deformable and flexible for transmitting to the container contents externally applied pressure of sufficient magnitude to rupture said more rupturable portions, said liquid dispersion being sufficient in amount to treat an area of a photosensitive silver halide element at least as great as the maximum area of said container.

102. The product of claim 101 wherein an organic film-forming colloid is included in the dispersion.

103. The product of claim 102 wherein the dispersion is an aqueous alkaline solution and the colloid is a plastic dissolved in said aqueous alkaline solution, said plastic being capable of retaining its viscosity imparting characteristics in an alkaline solution, the viscosity of the solution being of the order of 1,000 to 200,000 centipoises at 24° C.

104. The product of claim 103 wherein the plastic is sodium carboxymethyl cellulose.

105. The product of claim 104 wherein the solution includes hydroquinone, sodium thiosulfate and sodium hydroxide.

106. A photographic product capable of dispensing a processing agent for processing a photosensitive silver halide element, said product comprising a rupturable, disposable, elongated container holding a liquid dispersion which includes at least one reagent from the class consisting of the silver halide developers and the silver halide fixers, longitudinally extending portions of said container being uniformly more rupturable than other portions of the container and providing, upon rupture, a liquid-dispensing passage along a substantial length of the container, the container walls being at least in part deformable and flexible for transmitting to the container contents externally applied pressure of sufficient magnitude to rupture said more rupturable portions.

107. A photographic product for dispensing a silver halide developer directly to a photosensitive silver halide element for processing the same, said product comprising an elongated container holding a liquid dispersion including a film-forming colloid and a silver halide developer, said silver halide developer being in an amount sufficient to develop an area of a photosensitive silver halide emulsion at least as great as the maximum area of said container, portions of the container walls being secured together in face-to-face relation to provide a liquid dispensing lip extending along a substantial length of the container, the material of the container walls being stronger than the seal of the dispensing lip and said walls being at least in part deformable and flexible for transmitting to the container contents externally applied pressure of sufficient magnitude to open said lip.

108. The product of claim 107 wherein the liquid dispersion is an alkaline aqueous solution and the colloid is a plastic dissolved in said solution.

109. The product of claim 108 wherein the container is substantially flat, multi-sided and oxygen impervious and said lip extends substantially the entire length of one long side of said container.

110. A photographic product capable of uniformly dispensing a photographic reagent when squeezed between a pair of sheet materials by a pair of pressure-applying members, said product comprising a rupturable disposable container holding a sufficient quantity of a processing liquid for a single application, said liquid including a photographic image-transforming reagent for transforming an image in a photographically photosensitive element, said container being elongated and having the walls thereof at least in part deformable and flexible for transmitting pressures applied thereto to the container contents, said container having one long edge adapted to be drawn between a pair of pressure-applying members and a liquid dispensing lip opposite said edge, said liquid dispensing lip comprising portions of the container walls secured together in face-to-face relation and capable, by separation, of permitting the contents of the container to be dispensed between two sheet materials away from the container in a direction substantially perpendicular to the long dimension thereof, said container walls consisting of an upper and lower wall, each wall extending continuously, without folds, throughout its entire area, the total thickness of the container walls, measured depthwise at any point of the container, not appreciably exceeding the sum of a single thickness of the material of the upper wall and a single thickness of the material of the lower wall whereby said container, when passed between a pair of pressure-applying members, is capable of being flattened to a substantially uniform thickness.

111. The product of claim 110 in which the processing liquid is an aqueous alkaline solution whose viscosity is in excess of 1,000 centipoises at 24° C.

112. The product of claim 111 wherein the processing liquid contains, as a thickening agent, a soluble salt of carboxymethyl cellulose.

113. The product of claim 110 wherein the reagent is at least one processing agent from the class consisting of the silver halide developers and the silver halide fixers.

114. A product capable of forming transfer prints in conjunction with a photosensitive silver halide element and a print-receiving layer, said product comprising a substantially flat, multi-sided, elongated disposable, single use container holding an aqueous solution which includes, as ingredients, hydroquinone, sodium thiosulfate, sodium hydroxide and sodium carboxymethyl cellulose, said solution having a viscosity of the order of 1,000 to 200,000 centipoises at a temperature of approximately 24° C., the container walls being formed of a deformable sheet material, said walls being secured together in face-to-face relation along a long edge of the container to provide a liquid dispensing lip adjacent said edge extending substantially the length of the container, said sheet material being stronger than the seal of the dispensing lip and being sufficiently deformable and flexible to transmit to the container contents externally applied pressure of sufficient magnitude to open said lip, the viscous contents of said container cooperating with said lip to insure more uniform unsealing thereof upon the application of sufficient pressure to the container walls.

115. A photographic product capable of dispensing a photographic reagent directly to a photosensitive element for developing the same, said product comprising a rupturable, disposable, externally dry container holding a sufficient quantity of processing liquid for a single application, which liquid includes a reducing agent for developing the exposed portion of a photosensitive element having as its photosensitive material a heavy metal salt capable of forming a latent image upon photoexposure and capable of being developed by said reducing agent to produce a visible image comprising the metal of said salt, said container being multi-sided and elongated and having the walls thereof formed of a deformable sheet material, said walls being impervious to water vapor and to oxygen and being secured together in face-to-face relation along a long edge of the container to provide a liquid-dispensing lip at said edge extending substantially the length of the container, said sheet material being stronger than the seal of the dispensing lip and being sufficiently deformable and flexible to transmit to the container contents externally applied pressure of sufficient magnitude to open said lip, the liquid in the container including a thickening agent which imparts thereto a viscosity of the order of 1,000 to 200,000 centipoises at a temperature of approximately 24° C., said liquid in its viscous condition cooperating with said container to insure uniform unsealing of said liquid-dispensing lip upon the application of sufficient pressure to the container walls.

116. The product of claim 115 wherein the container is flat and substantially rectangular in shape and is formed of a single sheet of folded material, the fold providing one long edge thereof and the marginal portions opposite the fold being adhesively secured in face-to-face relation to provide the dispensing lip.

EDWIN H. LAND.

REFERENCES CITED

The following references are of record in the file of this patent:

UNITED STATES PATENTS

| Number | Name | Date |
|---|---|---|
| 786,534 | Thornton et al. | Apr. 4, 1905 |
| 916,325 | Kelley | Mar. 23, 1909 |
| 1,207,042 | Hochstetter | Dec. 5, 1916 |
| 1,277,048 | de Brayer | Aug. 27, 1918 |
| 1,360,624 | Dodge | Nov. 30, 1920 |
| 1,592,379 | Merle | July 13, 1926 |
| 1,592,584 | Viegelmann | July 13, 1926 |
| 1,742,809 | Hoover | Jan. 7, 1930 |
| 2,071,821 | Eckhardt | Feb. 23, 1937 |
| 2,121,397 | Downing | June 21, 1938 |
| 2,136,007 | Gish | Nov. 8, 1938 |
| 2,139,040 | Salfisberg | Dec. 6, 1938 |
| 2,197,994 | Butement | Apr. 23, 1940 |
| 2,211,498 | Files | Aug. 13, 1940 |
| 2,259,796 | Clark | Oct. 21, 1941 |
| 2,299,694 | Green | Oct. 20, 1942 |
| 2,319,560 | Salfisberg | May 18, 1943 |
| 2,322,005 | Fierke | June 15, 1943 |
| 2,322,006 | Fierke | June 15, 1943 |
| 2,322,027 | Jelley et al. | June 15, 1943 |
| 2,347,640 | Peters | May 2, 1944 |
| 2,352,014 | Rott | June 20, 1944 |
| 2,361,936 | Gaspor | Nov. 7, 1944 |
| 2,430,995 | Roos | Nov. 18, 1947 |

FOREIGN PATENTS

| Number | Country | Date |
|---|---|---|
| 9,248 | Great Britain | 1905 |
| 7,521 | Great Britain | June 28, 1906 |
| 21,692 of 1907 | Great Britain | Oct. 1, 1908 |
| 369,146 | Germany | Feb. 15, 1923 |
| 370,821 | Germany | Mar. 8, 1923 |
| 328,762 | Great Britain | May 8, 1930 |
| 567,011 | Germany | July 22, 1931 |
| 541,045 | Great Britain | Nov. 11, 1941 |
| 879,995 | France | Mar. 5, 1942 |